US010990824B2

(12) United States Patent
Saito

(10) Patent No.: US 10,990,824 B2
(45) Date of Patent: *Apr. 27, 2021

(54) IMAGE PROCESSING APPARATUS, IMAGE PROCESSING METHOD, PROGRAM, AND RECORDING MEDIUM

(71) Applicant: FUJIFILM Corporation, Tokyo (JP)

(72) Inventor: Masaki Saito, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 300 days.

This patent is subject to a terminal disclaimer.

(21) Appl. No.: 16/144,684

(22) Filed: Sep. 27, 2018

(65) Prior Publication Data

US 2019/0026561 A1 Jan. 24, 2019

Related U.S. Application Data

(63) Continuation of application No. 15/414,709, filed on Jan. 25, 2017, now Pat. No. 10,115,018.

(30) Foreign Application Priority Data

Mar. 1, 2016 (JP) ................................ 2016-038677

(51) Int. Cl.
G06K 9/00 (2006.01)
H04N 1/21 (2006.01)
(Continued)

(52) U.S. Cl.
CPC ....... *G06K 9/00684* (2013.01); *G06K 9/6215* (2013.01); *G06Q 10/10* (2013.01);
(Continued)

(58) Field of Classification Search
None
See application file for complete search history.

(56) References Cited

U.S. PATENT DOCUMENTS 7,599,987 B2 * 10/2009 Kondo .................. G06Q 30/02
709/203
8,044,945 B2 10/2011 Takamori et al.
(Continued)

FOREIGN PATENT DOCUMENTS

JP 2001-297051 A 10/2001
JP 2008-257308 A 10/2008
(Continued)

*Primary Examiner* — Hadi Akhavannik
(74) *Attorney, Agent, or Firm* — Studebaker & Brackett PC

(57) ABSTRACT

In the image processing apparatus, the image processing method, and the recording medium of the invention, an image analysis unit analyzes the contents of each of a plurality of images acquired by an image acquisition unit, and an evaluation value calculation unit calculates an analysis evaluation value of each image based on the analysis result of each image. A group forming unit forms one or more groups, each of which includes a plurality of similar images, by specifying similar images among the plurality of images. The evaluation value calculation unit calculates an overall evaluation value by adding a value to an analysis evaluation value of each of the plurality of similar images based on evaluation information, which indicates high evaluation for the plurality of similar images, for each of the groups.

18 Claims, 31 Drawing Sheets

(51) Int. Cl.
- *H04N 1/44*    (2006.01)
- *H04N 1/00*    (2006.01)
- *G06Q 30/06*   (2012.01)
- *G06Q 10/10*   (2012.01)
- *G06K 9/62*    (2006.01)

(52) U.S. Cl.
CPC ......... *G06Q 30/06* (2013.01); *G06Q 30/0621* (2013.01); *H04N 1/0044* (2013.01); *H04N 1/00196* (2013.01); *H04N 1/2187* (2013.01); *H04N 1/4413* (2013.01)

(56) References Cited

U.S. PATENT DOCUMENTS

| | | | |
|---|---|---|---|
| 10,115,018 B2* | 10/2018 | Saito | G06K 9/00684 |
| 2008/0040748 A1* | 2/2008 | Miyaki | G11B 27/036 |
| | | | 725/46 |
| 2010/0195874 A1* | 8/2010 | Isogai | G06F 16/784 |
| | | | 382/115 |
| 2012/0072466 A1* | 3/2012 | Ishizaki | G06F 16/35 |
| | | | 707/803 |
| 2015/0092070 A1 | 4/2015 | Hatano et al. | |

FOREIGN PATENT DOCUMENTS

| | | |
|---|---|---|
| JP | 2009-303002 A | 12/2009 |
| JP | 2015-069431 A | 4/2015 |
| JP | 2015-133000 A | 7/2015 |

\* cited by examiner

FIG. 19

```
< 3. CHECK/SAVE CONTENTS
STEP1>STEP2>STEP3>STEP4
2/3   LOG IN AND SAVE INPUT CONTENTS SO
      FAR.

E-MAIL ADDRESS
[                    ]
PASSWORD
[                    ]

[         LOGIN         ]
[NEW MEMBERSHIP ] [PASSWORD FORGOT]
[ REGISTRATION  ]
```

FIG. 23

| < | 4. CREATE/SEND INVITATION LETTER |
|---|---|

STEP1〉STEP2〉STEP3〉STEP4

3/3  PLEASE SEND INVITATION LETTER AND PASSWORD TO EVERYONE BY SNS OR E-MAIL.

SEND INVITATION LETTER

| SNS | E-MAIL |

INVITATION LETTER URL http://XXXXXXX

PASSWORD

5865

| NEXT |

IMAGE PROCESSING APPARATUS, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2016-038677, filed Mar. 1, 2016, and U.S. patent application Ser. No. 15/414,709, filed Jan. 25, 2017, all of which are hereby expressly incorporated by reference into the present application.

BACKGROUND OF THE INVENTION

1. Field of the Invention

The present invention relates to an image processing apparatus, an image processing method, and a recording medium for creating a composite image, such as a photobook, using a plurality of images acquired from terminal devices of a plurality of users through a network.

2. Description of the Related Art

A photobook is a service to create a photo collection of a layout that a user desires using a plurality of transmitted images (image data) when the user transmits the plurality of images to a service provider through the Internet.

For example, a photobook is created by classifying a plurality of images into a plurality of groups based on the imaging time or the like in consideration of the continuity or relevance of images and automatically arranging (automatically laying out) images included in each group on corresponding pages.

In recent years, not only creating one photobook using a plurality of images owned by one user but also creating one photobook using a plurality of images owned by a plurality of users (refer to JP2008-257308A and JP2015-069431A), acquiring messages for writing from a plurality of users and creating a writing using the messages for writing acquired from the plurality of users (refer to JP2001-297051A and JP2015-133000A), making users vote for an image selected from thumbnail images and creating an electronic album including images with many votes (refer to JP2009-303002A), and the like are known.

SUMMARY OF THE INVENTION

For example, a case is considered in which a plurality of images are acquired from a plurality of users for a predetermined period and a composite image, such as a photobook, is created using images having a large number of pieces of evaluation information indicating high evaluation given by the users among the plurality of acquired images.

In this case, if similar images are present among the plurality of acquired images, evaluation information indicating high evaluation may be given to only one of the plurality of similar images, for example. That is, even though the other similar images are also favorite images of the users, evaluation information indicating high evaluation is not given. Therefore, there has been a problem that each similar image cannot be correctly evaluated based on the number of pieces of evaluation information.

It is an object of the present invention to provide an image processing apparatus, an image processing method, and a recording medium capable of correctly evaluating each similar image based on evaluation information even in a case where a plurality of similar images are present.

In order to achieve the aforementioned object, the invention provides an image processing apparatus comprising: an image acquisition unit that acquires a plurality of images from terminal devices of a plurality of users through a network for a predetermined period; an image analysis unit that analyzes contents of each of the plurality of images; an evaluation value calculation unit that calculates an analysis evaluation value of each of the images based on an analysis result of each of the images; an evaluation information acquisition unit that acquires evaluation information, which indicates evaluation for each of the images that is given by the plurality of users, from the terminal devices of the plurality of users through the network for the predetermined period; and a group forming unit that forms one or more groups, each of which includes a plurality of similar images, by specifying the plurality of similar images, among the plurality of images, based on the analysis result of each of the images after the predetermined period has passed. The evaluation value calculation unit calculates an overall evaluation value by adding a value to an analysis evaluation value of each of the plurality of similar images based on evaluation information, which indicates high evaluation for the plurality of similar images, for each of the groups.

Here, it is preferable that the evaluation value calculation unit uniformly adds the same value to the analysis evaluation value of each of the similar images.

It is preferable that the evaluation value calculation unit adds a weighting, which increases as the analysis evaluation value of each of the similar images increases, to the analysis evaluation value of each of the similar images.

It is preferable to further comprise: an evaluation number calculation unit that calculates the number of pieces of evaluation information, which indicates the high evaluation for each of the images, after the predetermined period has passed; and a similar image extraction unit that extracts a similar image, of which the analysis evaluation value exceeds a threshold value, among the plurality of similar images for each of the groups. It is preferable that the evaluation value calculation unit adds a weighting, which increases as the number of pieces of evaluation information indicating the high evaluation for each of the plurality of similar images increases, to an analysis evaluation value of the similar image extracted by the similar image extraction unit.

It is preferable to further comprise: an evaluation number calculation unit that calculates the number of pieces of evaluation information, which indicates the high evaluation for each of the images, after the predetermined period has passed; and a similar image specifying unit that specifies a similar image with the highest number of pieces of evaluation information indicating the high evaluation, among the plurality of similar images, for each of the groups. It is preferable that the evaluation value calculation unit adds a weighting, which increases as the number of pieces of evaluation information indicating the high evaluation for the similar image specified by the similar image specifying unit increases, to the analysis evaluation value of each of the similar images.

It is preferable to further comprise an evaluation number calculation unit that calculates the number of pieces of evaluation information, which indicates the high evaluation for each of the images, after the predetermined period has passed. It is preferable that the evaluation value calculation unit adds a weighting, which increases as the number of pieces of evaluation information indicating the high evaluation for each of the plurality of similar images increases, to the analysis evaluation value of each of the similar images.

It is preferable that the evaluation value calculation unit adds a weighting, which increases as a time at which evaluation information indicating the high evaluation is given, in the predetermined period, becomes late, to the analysis evaluation value of each of the images.

It is preferable that the evaluation value calculation unit adds a weighting, which increases as a ratio of the number of users who have given evaluation information indicating the high evaluation to the number of users who have viewed each of the images increases, to the analysis evaluation value of each of the images.

It is preferable that the evaluation value calculation unit further adds a weighting, which increases as the number of users who have viewed each of the images increases, to the analysis evaluation value of each of the images.

It is preferable that the evaluation value calculation unit adds a weighting, which is higher for evaluation information indicating the high evaluation acquired from terminal devices of users who have viewed an image included in the plurality of images a large number of times than for evaluation information indicating the high evaluation acquired from terminal devices of users who have viewed an image included in the plurality of images a small number of times, to the analysis evaluation value of each of the images.

It is preferable to further comprise an importance setting unit that acquires importance of each of the users set by at least one first user of the plurality of users, through the network, from a terminal device of the first user. It is preferable that the evaluation value calculation unit adds a weighting, which is higher for evaluation information indicating the high evaluation acquired from terminal devices of users having the high importance than for evaluation information indicating the high evaluation acquired from terminal devices of users having the low importance, to the analysis evaluation value of each of the images.

It is preferable that the importance setting unit sets the importance to be higher for a user who is more intimate with a user set in advance among the plurality of users.

It is preferable that the importance setting unit sets the importance of a user who has a lot of knowledge about an image set in advance to be higher than the importance of users other than the user who has a lot of knowledge about the image.

It is preferable that the evaluation value calculation unit adds a weighting, which is higher for evaluation information indicating the high evaluation acquired from a terminal device of a user appearing in the plurality of images than for evaluation information indicating the high evaluation acquired from a terminal device of a user not appearing in the plurality of images, to the analysis evaluation value of each of the images.

It is preferable that, for images that the image acquisition unit acquire from a terminal device of one second user among the plurality of users, the evaluation value calculation unit adds a weighting, which is higher for evaluation information indicating the high evaluation given by the second user than for evaluation information indicating the high evaluation given by users other than the second user, to the analysis evaluation value of each of the images.

It is preferable to further comprise an evaluation number calculation unit that calculates the number of pieces of evaluation information, which indicates the high evaluation for each of the images, after the predetermined period has passed. It is preferable that the evaluation value calculation unit adds a weighting, which increases as the number of pieces of evaluation information indicating the high evaluation for each of the plurality of similar images increases, to the analysis evaluation value of each of the similar images.

It is preferable to further comprise an evaluation prompting unit that transmits reminder information to prompt assignment of the evaluation information for each of the images, through the network, to the terminal devices of the plurality of users whenever each of the images is acquired.

It is preferable to further include an evaluation user setting unit that acquires information of at least one third user among the plurality of users set by at least one first user among the plurality of users, who is an evaluation user who gives the evaluation information, through the network from a terminal device of the first user. It is preferable that the evaluation prompting unit transmits the reminder information to a terminal device of the evaluation user.

It is preferable that the evaluation prompting unit transmits the reminder information using an application for sending and receiving an e-mail or a message.

It is preferable that the evaluation information acquisition unit further acquires evaluation information indicating low evaluation for each of the images given by the plurality of users and that the evaluation value calculation unit further calculates the overall evaluation value by subtracting a value from the analysis evaluation value of each of the images based on the evaluation information indicating the low evaluation for the plurality of images.

It is preferable to further comprise a comment acquisition unit that acquires comments on each of the images given by the plurality of users, through the network, from the terminal devices of the plurality of users. It is preferable that the evaluation value calculation unit adds a value to an analysis evaluation value of an image to which the comments have been given among the plurality of images.

It is preferable to further comprise a recommended information display unit that, in a case where an image having the analysis evaluation value exceeding a threshold value, among the plurality of images, is displayed on an image display unit of a terminal device of each of the users, displays information indicating a recommended image for the image having the analysis evaluation value exceeding the threshold value.

It is preferable that the evaluation information acquisition unit prohibits one second user himself or herself, among the plurality of users, from giving the evaluation information to an image that the image acquisition unit acquires from a terminal device of the one second user.

It is preferable that the evaluation information acquisition unit displays an image, which is selected from the plurality of images by each of the users, in an enlarged manner on an image display unit of a terminal device of each of the users, and acquires evaluation information given to the image displayed in an enlarged manner.

It is preferable that, in a case where the users display the plurality of images as minified pictures on image display units of terminal devices of the users, the evaluation information acquisition unit acquires evaluation information given to each of the minified pictures.

It is preferable to further comprise an evaluation number calculation unit that calculates the number of pieces of evaluation information indicating the high evaluation for each of the images. It is preferable that, in a case where the users display the plurality of images as minified pictures on image display devices of the terminal devices of the users, the evaluation information acquisition unit displays the minified picture corresponding to each of the images so as to be more enlarged as the number of pieces of evaluation information indicating the high evaluation for each of the images increases.

In addition, the invention provides an image processing method including: a step in which an image acquisition unit acquires a plurality of images from terminal devices of a plurality of users through a network for a predetermined period; a step in which an image analysis unit analyzes contents of each of the plurality of images; a step in which an evaluation value calculation unit calculates an analysis evaluation value of each of the images based on an analysis result of each of the images; a step in which an evaluation information acquisition unit acquires evaluation information, which indicates evaluation for each of the images that is given by the plurality of users, from the terminal devices of the plurality of users through the network for the predetermined period; a step in which a group forming unit forms one or more groups, each of which includes a plurality of similar images, by specifying the plurality of similar images, among the plurality of images, based on the analysis result of each of the images after the predetermined period has passed; and a step in which the evaluation value calculation unit calculates an overall evaluation value by adding a value to an analysis evaluation value of each of the plurality of similar images based on evaluation information, which indicates high evaluation for the plurality of similar images, for each of the groups.

In addition, the invention provides a program stored in a non-transitory computer-readable recording medium causing a computer to execute each step of the image processing method described above.

In addition, the invention provides a computer-readable recording medium in which a program causing a computer to execute each step of the image processing method described above is recorded.

According to the invention, even in a case where a plurality of similar images are present, it is possible to calculate the overall evaluation value by correctly evaluating each similar image based on the evaluation information indicating high evaluation and low evaluation for a plurality of similar images.

BRIEF DESCRIPTION OF THE DRAWINGS

FIG. 19 is a conceptual diagram of an example showing a screen for inputting account information.

FIG. 23 is a conceptual diagram of an example showing a screen for sending an invitation letter to the terminal device of the participating user.

FIG. 25 is a conceptual diagram of an example showing a screen for inputting a common password for accessing a screen onto which participating users uploads images used in a composite image, evaluation information of images, messages for writing, and the like.

DESCRIPTION OF THE PREFERRED EMBODIMENTS

Hereinafter, an image processing apparatus, an image processing method, and a recording medium of the invention will be described in detail based on a preferred embodiment shown in the accompanying diagrams.

Figure 1:
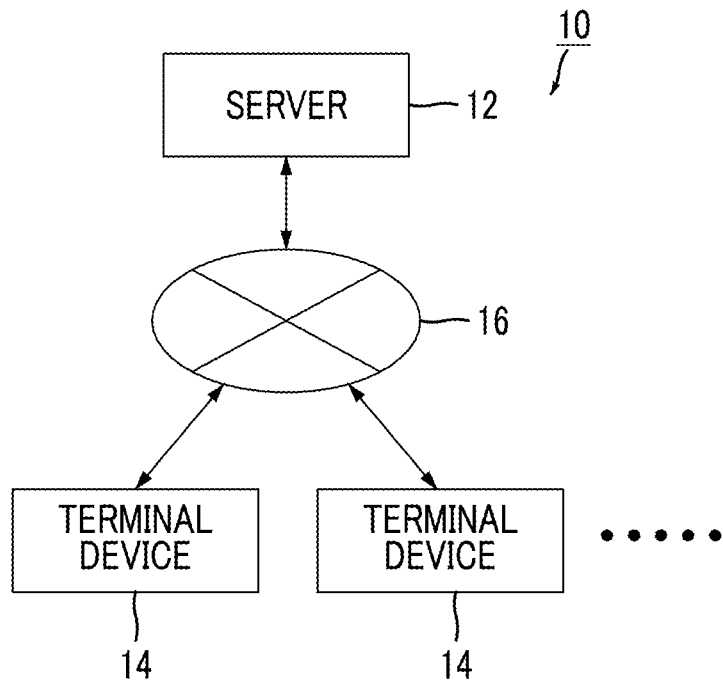
FIG. 1 is a block diagram of an embodiment showing the configuration of an image processing apparatus according to the invention.

FIG. 1 is a block diagram of an embodiment showing the configuration of the image processing apparatus according to the invention. An image processing apparatus 10 shown in FIG. 1 creates a composite image, such as a photobook including a writing page, using a plurality of images acquired from terminal devices of a plurality of users involved in the creation of a composite image through a network 16. The image processing apparatus 10 includes a server 12 and terminal devices (clients) 14 of a plurality of users connected to the server 12 through the network 16.

The server 12 performs various kinds of data processing for creating a composite image based on an instruction from the terminal device 14, and is configured by, for example, a desktop personal computer (PC) or a workstation.

The terminal device 14 gives various instructions to the server 12 to perform various kinds of data processing, and is configured by, for example, a smartphone, a tablet PC, or a notebook PC.

The network 16 is, for example, a telephone line or the Internet circuit, and connects the server 12 and the terminal device 14 to each other by wired or wireless connection to enable bidirectional communication.

Figure 2:
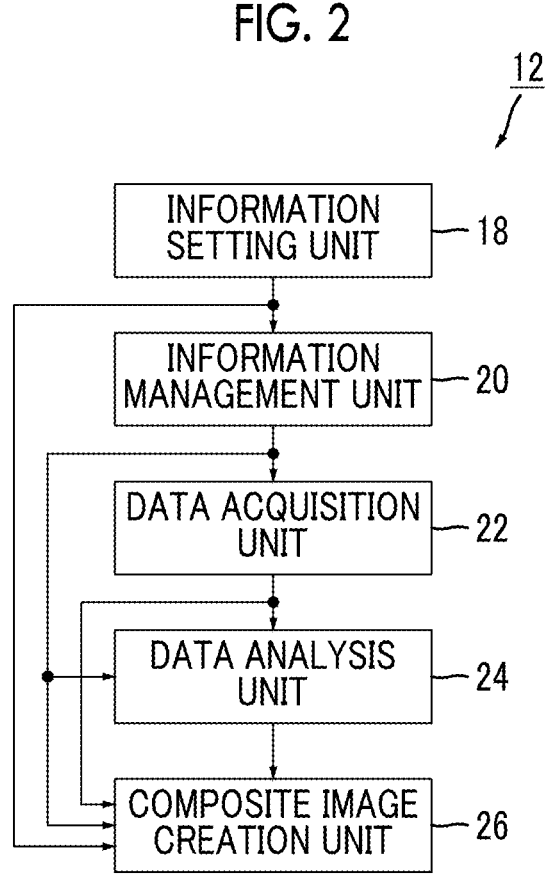
FIG. 2 is a block diagram of an embodiment showing the configuration of a server shown in FIG. 1.

FIG. 2 is a block diagram of an embodiment showing the configuration of the server shown in FIG. 1. The server 12 shown in FIG. 2 includes an information setting unit 18 for setting various kinds of information regarding a composite image, an information management unit 20 for managing various kinds of information regarding the creation of a composite image, a data acquisition unit 22 for acquiring various kinds of data used in a composite image, a data analysis unit 24 for analyzing various kinds of data used in a composite image, and a composite image creation unit 26 for creating a composite image.

In the following explanation, among a plurality of users involved in the creation of a composite image including a main page and a writing page, one user who creates a composite image is expressed as a secretary user, and two or more users including the secretary user are expressed as participating users. For example, a case where a secretary is one of a group of friends corresponds to this.

However, in another embodiment, in a case where the secretary himself or herself provides neither photos nor messages, such as a case where a photo shop undertakes an agency as a secretary, it is assumed that the number of secretary users does not include the number of participating users.

Figure 3:
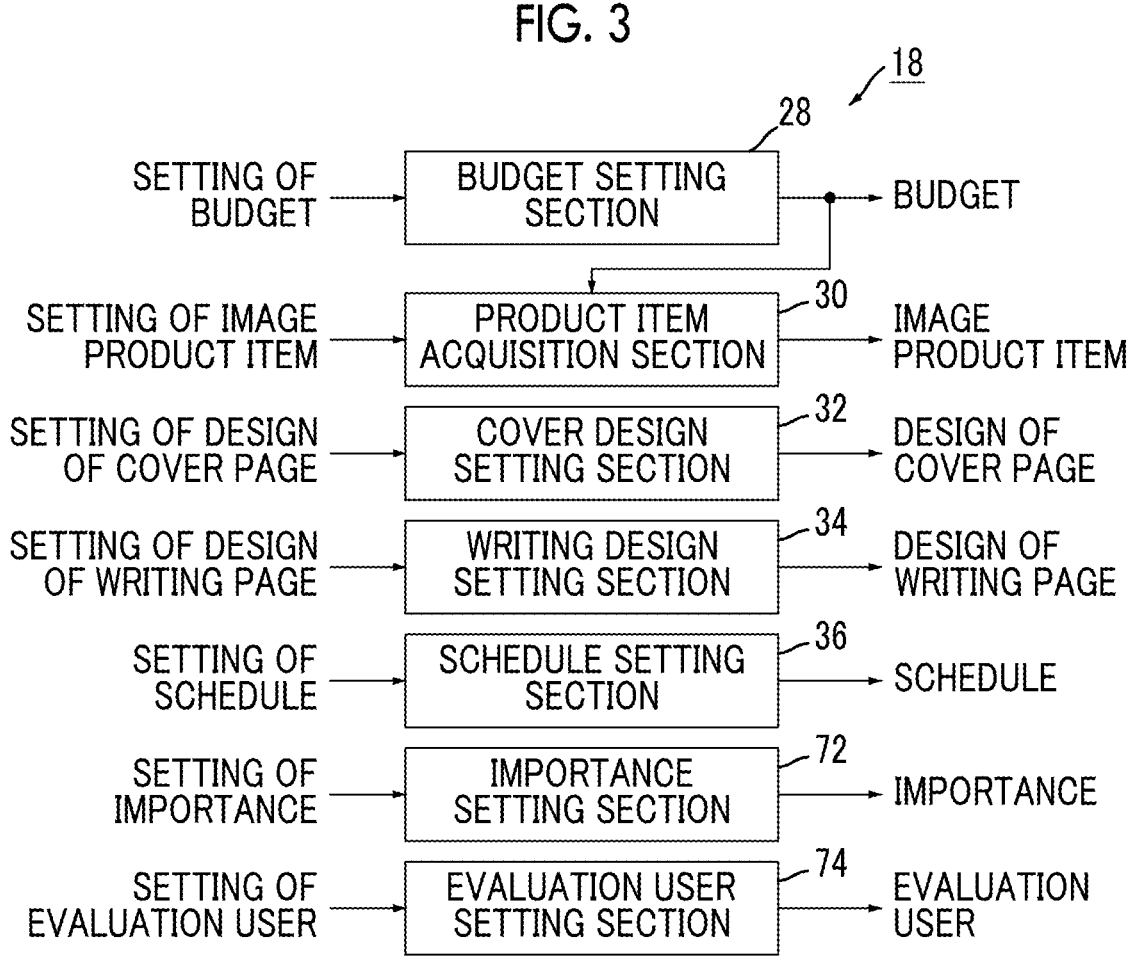
FIG. 3 is a block diagram of an embodiment showing the configuration of an information setting unit shown in FIG. 2.

FIG. 3 is a block diagram showing the configuration of an embodiment showing the configuration of the information setting unit shown in FIG. 2. The information setting unit 18 shown in FIG. 3 includes a budget setting section 28, a product item acquisition section 30, a cover design setting section 32, a writing design setting section 34, a schedule setting section 36, an importance setting section 72, and an evaluation user setting section 74.

The budget setting section 28 acquires information regarding a budget for a composite image, which is set by the secretary user, from the terminal device 14 of the secretary user through the network 16.

Subsequently, the product item acquisition section 30 acquires one image product item set by the secretary user, among one or more image product items (information of image product items) with a size and the number of pages corresponding to the budget information acquired by the budget setting section 28, from the terminal device 14 of the secretary user through the network 16.

The image product item is an item for creating an image product, and includes, for example, a photo album such as a photobook, a shuffle print, a calendar with an image, and the like. Images are mainly photos.

In addition, image product items include a plurality of types of image product items having at least different sizes or different numbers of pages. The number of pages of the image product item is the number of pages including a main page and a writing page. An image product includes an image product of a paper medium and an image product of electronic data.

A page referred to in the invention means a unit for performing images arrangement and writings arrangement. In the present embodiment, a page refers to a two-page spread page. However, in other embodiments, a page may be a single-sided page. In addition, a two-page spread page may be set as a unit in the image processing apparatus 10 of the present embodiment, and the number of pages of the image product item may be displayed for the user with the single-sided page as a unit.

The photobook is, for example, a composite image obtained by arranging a plurality of images selected by the user on a plurality of pages in a layout that the user desires. In addition, the photobook may be a composite image obtained by arranging images, which are automatically selected from images in a desired period (for example, one year) that are held by the user, on a plurality of pages in an automatic layout (for example, an ear album manufactured by FUJIFILM Co., Ltd.). In addition, the shuffle print is a composite image obtained by arranging a plurality of images on one print by shuffling the plurality of images. The calendar with an image is a composite image obtained by arranging images corresponding to the calendar of each month, for example.

In the case of the present embodiment, a composite image is a photobook that includes a writing page at the end of the book. The writing page is a composite image in which messages for writing of two or more participating users acquired from the terminal devices 14 of the participating users are arranged. The message for writing is a message of each participating user used in the writing page.

In addition to the message for writing, a profile image may be placed on the writing page. Although the profile image is, for example, a face image of each participating user, other images may be used.

Subsequently, the cover design setting section 32 acquires information regarding the design of one cover page set by the secretary user, among the design of one or more cover pages, from the terminal device 14 of the secretary user through the network 16.

The information of the design of the cover page includes, for example, not only design information, such as a cover page pattern and illustrations drawn on the cover page, but also information of the title of a composite image described on the cover page, information of the color of the cover page, and the like.

Subsequently, the writing design setting section 34 acquires information regarding the design of one writing page set by the secretary user, among the design of one or more writing pages, from the terminal device 14 of the secretary user through the network 16.

The information of the design of the writing page includes, for example, information of a template in which positions, sizes, and the like for arranging the profile image and message for writing of each participating user on the writing page are set in advance.

Subsequently, the schedule setting section 36 acquires schedule information, which includes the deadline for images and messages for writing set by the secretary user, a composite image creation period, and the delivery date of an image product, from the terminal device 14 of the secretary user through the network 16.

The deadline for images and messages for writing indicates a deadline before which each participating user can upload (submit) images and messages for writing, that is, a deadline before which the image processing apparatus 10 can acquire images and messages for writing from the terminal device 14 of the participating user.

In addition, the composite image creation period indicates a period during which the secretary user creates a composite image using a plurality of images acquired from the terminal devices 14 of a plurality of users, in other words, a deadline for ordering an image product. The delivery date of an image product indicates a date to deliver the image product.

Subsequently, the importance setting section 72 acquires the importance of at least one first user of a plurality of users, for example, the importance of each participating user involved in the creation of a composite image set by the secretary user, from the terminal device 14 of the secretary user through the network 16.

For example, a higher importance can be set for a participating user who is more intimate with a user set in advance among a plurality of users. For example, in a wedding ceremony image, a higher importance is set for a friend who is more intimate with the bride and groom who is a leading character.

In this case, intimacy and users set in advance are set by the secretary user, for example. In addition, the intimacy can also be automatically calculated based on the analysis result of each image. For example, in a plurality of images, a participating user with many appearances, a participating user with many days to appear, and a participating user who have a large number of images taken together with a user set in advance can be determined to be a user who is very intimate with the user set in advance.

In addition, the importance of a participating user who has a lot of knowledge about an image set in advance can be set to be higher than the importance of participating users other than the participating user who has a lot of knowledge about the image. In this case, the participating user who has a lot of knowledge about the image is set by the secretary user.

Subsequently, the evaluation user setting section 74 acquires information of at least one first user (as an evaluation user who gives evaluation information) among a plurality of users, for example, information of at least one third user among a plurality of users set by the secretary user, for example, information of at least one participating user among a plurality of participating users, from the terminal device 14 of the secretary user through the network 16.

Figure 4:
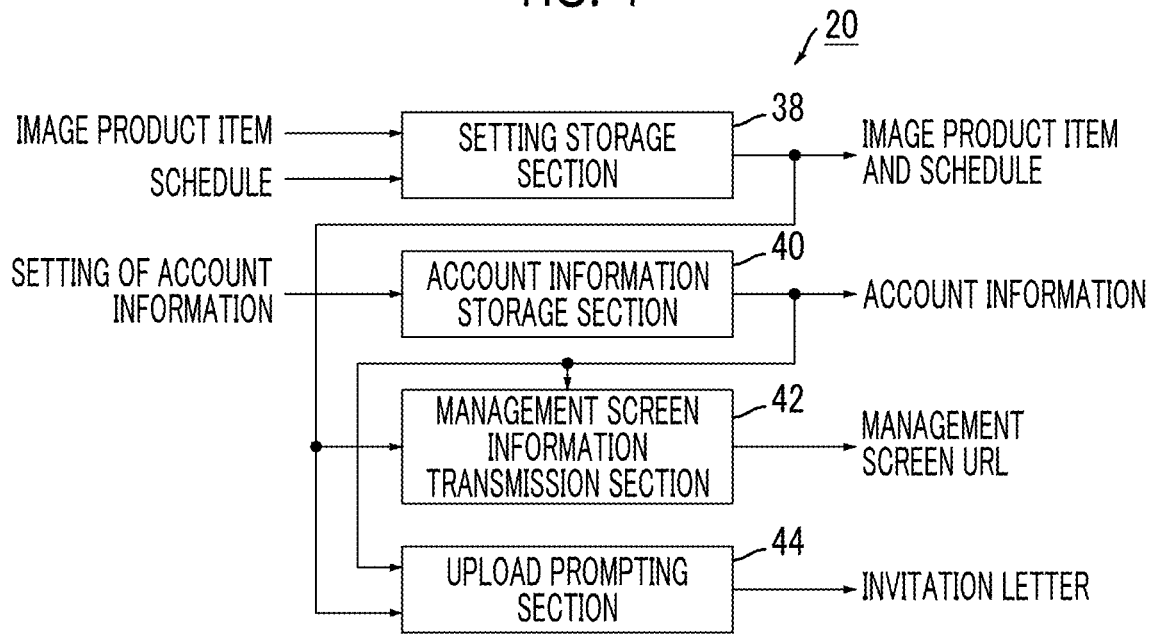
FIG. 4 is a block diagram of an embodiment showing the configuration of an information management unit shown in FIG. 2.

Subsequently, FIG. 4 is a block diagram of an embodiment showing the configuration of the information management unit shown in FIG. 2. The information management unit 20 shown in FIG. 4 includes a setting storage section 38, an account information storage section 40, a management screen information transmission section 42, and an upload prompting section 44.

The setting storage section 38 stores the information of the image product item acquired by the product item acquisition section 30 and the schedule acquired by the schedule setting section 36.

Subsequently, the account information storage section 40 acquires secretary user account information set by the secretary user from the terminal device 14 of the secretary user through the network 16. In addition, the account information storage section 40 acquires participating user account information set by the participating user from the terminal device 14 of the participating user through the network 16, and stores the participating user account information.

Figure 27:
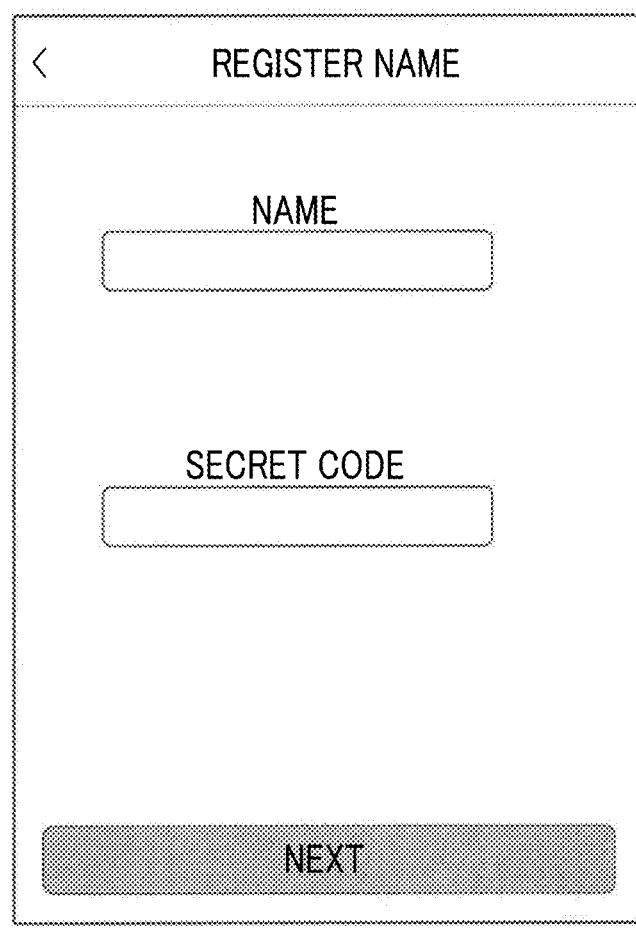
FIG. 27 is a conceptual diagram of an example showing a screen for registering a name registered as a participating user and a secret code.

For example, the secretary user account information is the e-mail address of the secretary user and the secretary password. On the other hand, the participating user account information is the name and individual password of the participating user (for the participating user, displayed as a "secret code" as shown in FIG. 27). The name of the participating user is used by the participating user to manage secretary users, and the individual password is used by the image processing apparatus 10 to specify a participating user. In the case of the present embodiment, it is assumed that the secret code cannot be changed and reissued later.

Subsequently, the management screen information transmission section 42 transmits a message, which includes an uniform resource locator (URL) required when the secretary user accesses a management screen for managing an image product item, a schedule, and the like, to the terminal device 14 of the secretary user through the network 16. The secretary user can make changes to secretary users, addition of a secretary user (for example, addition of a deputy secretary described later), and the like in addition to changing the image product item and schedule from the management screen.

For example, the management screen information transmission section 42 transmits a message including an URL for accessing the management screen, to the e-mail address of the secretary user acquired by the account information storage section 40, by e-mail.

Subsequently, the upload prompting section 44 sends an invitation letter created by the secretary user to the terminal device 14 of the participating user through the network 16.

The invitation letter is for inviting participating users to create a composite image, and is reminder information to prompt the participating users to upload images used in the composite image, evaluation information for each image, a profile image, a message for writing, and the like.

The upload prompting section 44 sends the invitation letter to the terminal device 14 of each participating user through a message of social networking service (SNS) or by e-mail, for example.

Figure 5:
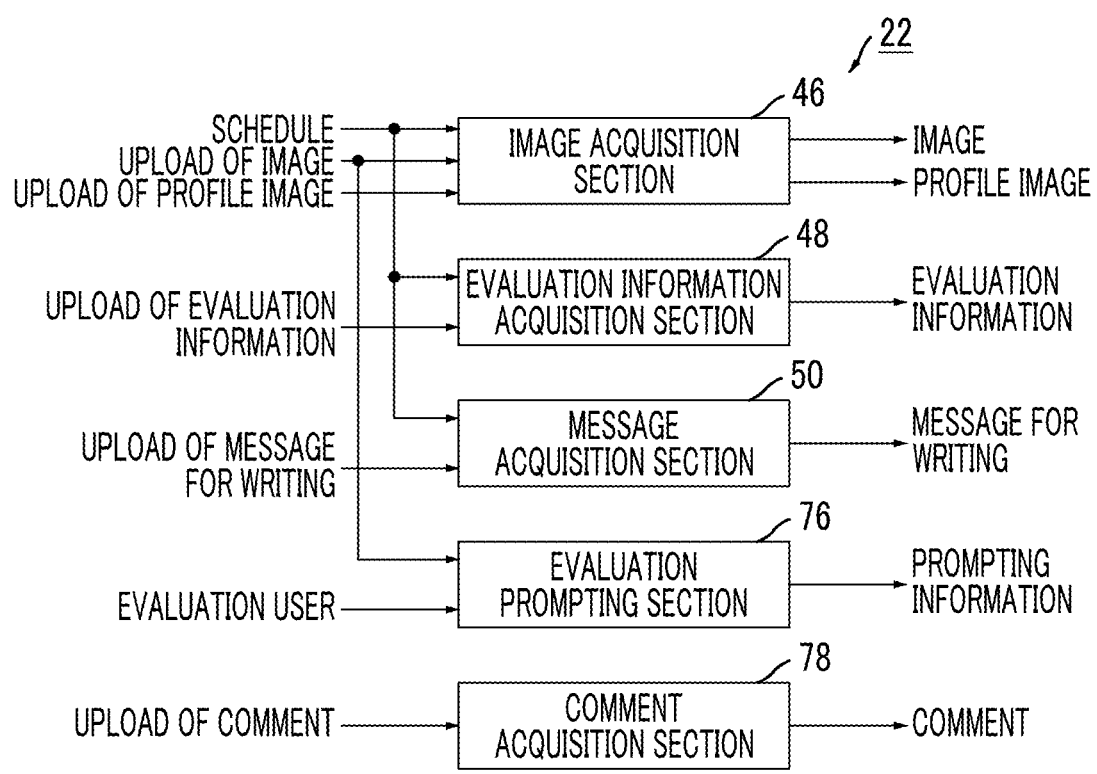
FIG. 5 is a block diagram of an embodiment showing the configuration of a data acquisition unit shown in FIG. 2.

Subsequently, FIG. 5 is a block diagram of an embodiment showing the configuration of the data acquisition unit shown in FIG. 2. The data acquisition unit 22 shown in FIG. 5 includes an image acquisition section 46, an evaluation information acquisition section 48, a message acquisition section 50, an evaluation prompting section 76, and a comment acquisition section 78.

The image acquisition section 46 acquires a plurality of images (image group) transmitted through the network 16 from the terminal devices 14 of two or more participating users for a predetermined period, in the case of the present embodiment, a period until the deadline for images and messages for writing set by the schedule setting section 36 after the invitation letter is sent. In addition, the image acquisition section 46 acquires the profile image of each participating user set by the participating user.

Subsequently, the evaluation information acquisition section 48 acquires evaluation information indicating evaluation for each image given by two or more participating users, through the network 16, from the terminal devices 14 of the two or more participating users for the same predetermined period.

The evaluation information of an image is information indicating the evaluation of each participating user for each image, for example, high evaluation or low evaluation.

Subsequently, the message acquisition section 50 acquires the message for writing uploaded by each participating user from the terminal device 14 of each participating user through the network 16 for the same predetermined period.

Subsequently, the evaluation prompting section 76 transmits reminder information to prompt the assignment of evaluation information for each image, through the network 16, to the terminal devices 14 of the plurality of users whenever the image acquisition section 46 acquires each image.

For example, the evaluation prompting section 76 can transmit reminder information using an application for sending and receiving an e-mail or an SNS message.

Subsequently, the comment acquisition section 78 acquires comments on each of images given by a plurality of users, through the network 16, from the terminal devices 14 of the plurality of users.

For example, the comments on each image are arranged in combination with the corresponding images in the main page.

Figure 6:
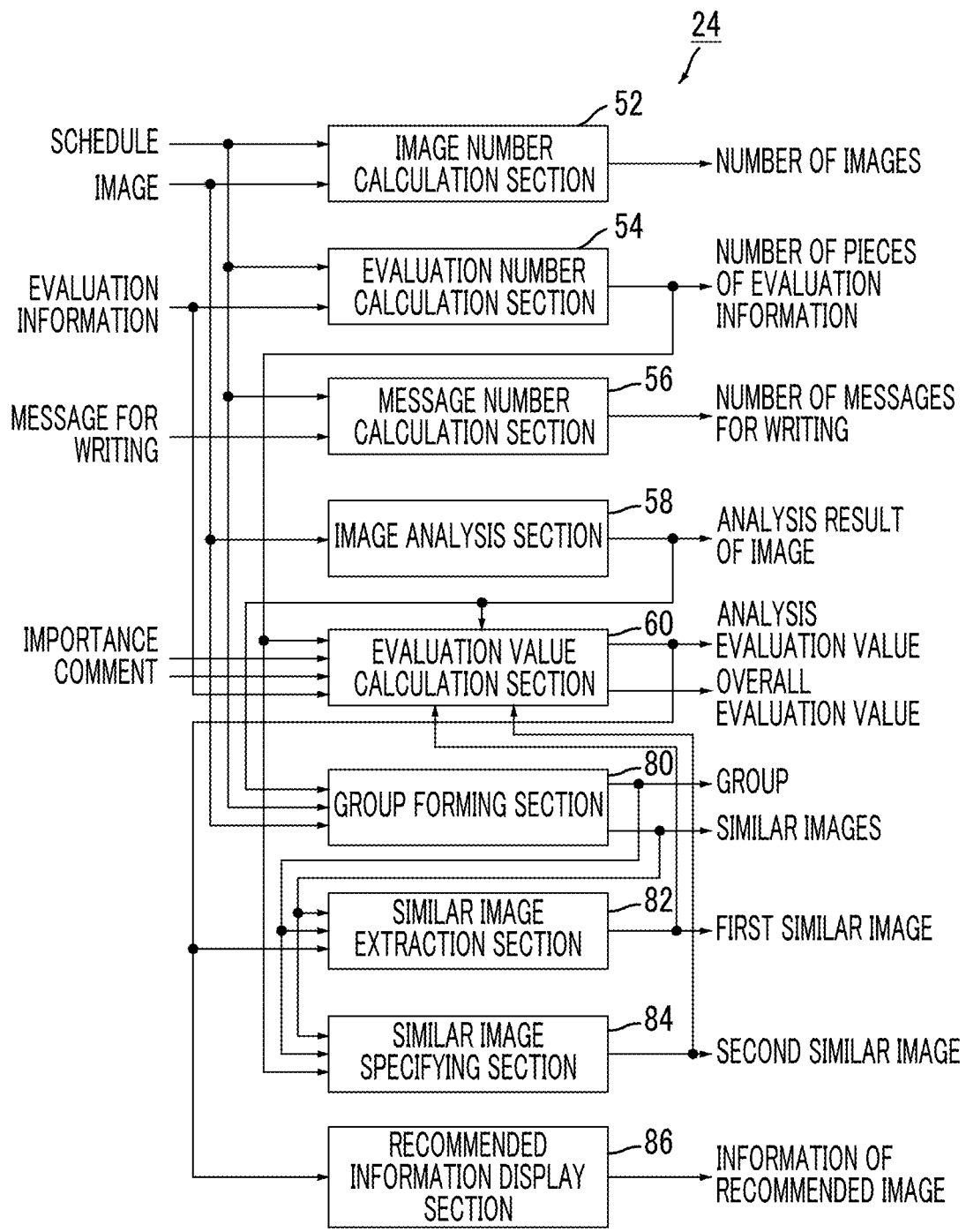
FIG. 6 is a block diagram of an embodiment showing the configuration of a data analysis unit shown in FIG. 2.

Subsequently, FIG. 6 is a block diagram of an embodiment showing the configuration of the data analysis unit shown in FIG. 2. The data analysis unit 24 shown in FIG. 6 includes an image number calculation section 52, an evaluation number calculation section 54, a message number calculation section 56, an image analysis section 58, a evaluation value calculation section 60, a group forming section 80, a similar image extraction section 82, a similar image specifying section 84, and a recommended information display section 86.

The image number calculation section 52 calculates the number of images acquired by the image acquisition section 46 after a predetermined period has passed since the invitation letter was sent by the upload prompting section 44, that is, after the deadline for images and messages for writing has passed.

Subsequently, the evaluation number calculation section 54 calculates the number of pieces of evaluation information indicating high evaluation and low evaluation, which have been acquired by the evaluation information acquisition section 48, after the deadline for images and messages for writing has passed.

Subsequently, the message number calculation section 56 calculates the number of messages for writing acquired by the message acquisition section 50 after the deadline for images and messages for writing has similarly passed.

Subsequently, the image analysis section 58 analyzes the contents of each image acquired by the image acquisition section 46. In the case of the present embodiment, the image analysis section 58 performs image analysis whenever an image is acquired by the image acquisition section 46.

For example, the image analysis section 58 analyzes the brightness or hue of an image, the degree of blurring, and the like. Note that blurring occurs in a case the subject is out of focus at the time of shooting, or in a case the subject moves when the shutter speed is relatively slow for example. In addition, in a case where a person's face is included in the image, the image analysis section 58 analyzes the size of the face, position of the face, direction of the face, skin color of the face, facial expression such as a smiling face, eye line, the number of persons included in the image, positional relationship of persons, and the like. Image analysis is performed by using discriminators obtained by machine learning methods such as SVM, Real AdaBoost, AdaBoost, and feature amount such as wavelet feature amount, Haar-like feature amount, Edgelet feature amount, EOH feature amount, HOG feature amount.

Subsequently, the evaluation value calculation section 60 calculates the analysis evaluation value of each image based on the analysis result of each image by the image analysis section 58. In addition, based on the evaluation information indicating high evaluation and low evaluation for each image acquired by the evaluation information acquisition section 48, the evaluation value calculation section 60 calculates an overall evaluation value of each image by adding or subtracting a value to or from the analysis evaluation value of each image or by giving a weighting to the analysis evaluation value of each image.

The evaluation value calculation section 60 can calculate an overall evaluation value of each image, for example, by adding a value to the analysis evaluation value of each image based on the number of pieces of evaluation information indicating high evaluation, which has been calculated by the evaluation number calculation section 54, and subtracting a value from the analysis evaluation value of each image based on the number of pieces of evaluation information indicating low evaluation.

Since the analysis evaluation value of each image is calculated based on the analysis result of the image, the analysis evaluation value of the image is a reference for determining whether or not the image is good or poor. Accordingly, it can be said that the higher the analysis evaluation value, the higher the image quality.

Since the overall evaluation value of an image is calculated based not only on the analysis result of the image but also on evaluation information indicating high evaluation and low evaluation that is given by the participating user, the overall evaluation value of the image is a reference for determining the preference of the participating user in addition to the good or bad of the image. Accordingly, it can be said that the higher the overall evaluation value, the higher the image quality or the more favorite image of the participating user.

Subsequently, after a predetermined period has passed, the group forming section 80 forms one or more groups, each of which includes a plurality of similar images, by specifying a plurality of similar images, among a plurality of images, based on the analysis result of each image.

Subsequently, the similar image extraction section 82 extracts similar images (first similar images) whose analysis evaluation values exceed a threshold value, among a plurality of similar images included in a group, for each group formed by the group forming section 80.

Subsequently, the similar image specifying section 84 specifies similar images (second similar images) with the highest number of pieces of evaluation information indicating high evaluation, among a plurality of similar images included in a group.

Subsequently, in a case where an image whose analysis evaluation value exceeds a threshold value, among the plurality of images, is displayed on an image display unit 68 of the terminal device 14 of each user, the recommended information display section 86 displays information indicating a recommended image for the image whose analysis evaluation value exceeds the threshold value.

Figure 7:
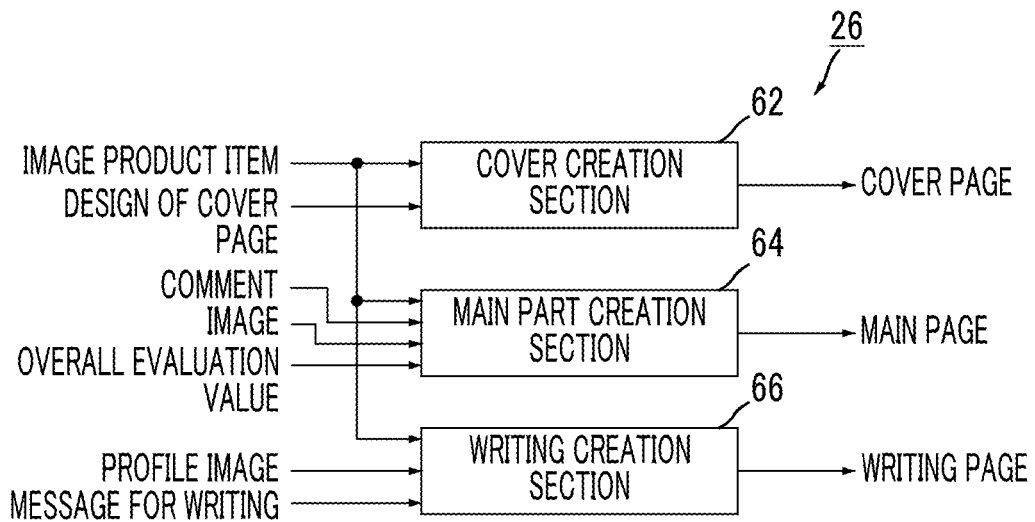
FIG. 7 is a block diagram of an embodiment showing the configuration of a composite image creation unit shown in FIG. 2.

Subsequently, FIG. 7 is a block diagram of an embodiment showing the configuration of the composite image creation unit shown in FIG. 2. The composite image creation unit 26 shown in FIG. 7 includes a cover creation section 62, a main part creation section 64, and a writing creation section 66.

The cover creation section 62 creates a cover page of the design corresponding to the information of the product item stored in the setting storage section 38 and the information of the design of the cover page acquired by the cover design setting section 32.

Subsequently, the main part creation section 64 creates main pages of the number of pages (pages other than the cover page and the writing page) corresponding to the information of the product item stored in the setting storage section 38 using a plurality of images acquired by the image acquisition section 46. The main part creation section 64 creates a composite image corresponding to the information of the product item stored in the setting storage section 38, in the case of the present embodiment, the main page of the photobook.

Although not shown, the main part creation section 64 includes an image division section, an image extraction section, an image arrangement section, and the like.

The image division section divides a plurality of images acquired by the image acquisition section 46 into groups the number of which corresponds to the number of main pages.

The image extraction section extracts, for each group of images, a plurality of compositing target images used in main pages, among images included in the group, based on the overall evaluation value of each image.

The image arrangement section determines the size of each compositing target image extracted by the image extraction section and the arrangement position in the main page, based on the overall evaluation value of each image, for each group of images, and arranges (automatically lays out) the compositing target images on the main pages of pages corresponding to the group of images.

Subsequently, the writing creation section 66 creates a writing page using a message for writing and a profile image of each participating user that have been acquired by the message acquisition section 50. The writing creation section 66 creates a writing page of the design corresponding to the information of the product item stored in the setting storage section 38 and the information of the design of the writing acquired by the writing design setting section 34.

Although not shown, the writing creation section 66 includes a message division section, a message arrangement section, and the like.

The message division section divides messages for writing acquired by the message acquisition section 50 into groups the number of which corresponds to the number of writing pages.

For each group of messages for writing, the message arrangement section arranges a message for writing included in the group on the writing page of the page corresponding to the group of messages for writing.

The number of writing pages is set according to the number of participating users, the number of messages for writing, and the like. In addition, the number of main pages is set according to the number of pages of a composite image, the number of writing pages, and the like. In the case of the present embodiment, it is assumed that a 16-page photobook is created by setting the number of participating users to 2 to 36 persons and arranging 2 to 12 messages for writing on the writing page of one page.

Each section that forms the information setting unit 18, the information management unit 20, the data acquisition unit 22, the data analysis unit 24, and the composite image creation unit 26 is realized, for example, by causing a control device, such as a central processing unit (CPU), to execute a program loaded onto the memory. The data stored in each section is stored in a storage device, such as a hard disk drive (HDD), a solid state drive (SSD), and a secure digital (SD) memory, for example.

Figure 8:
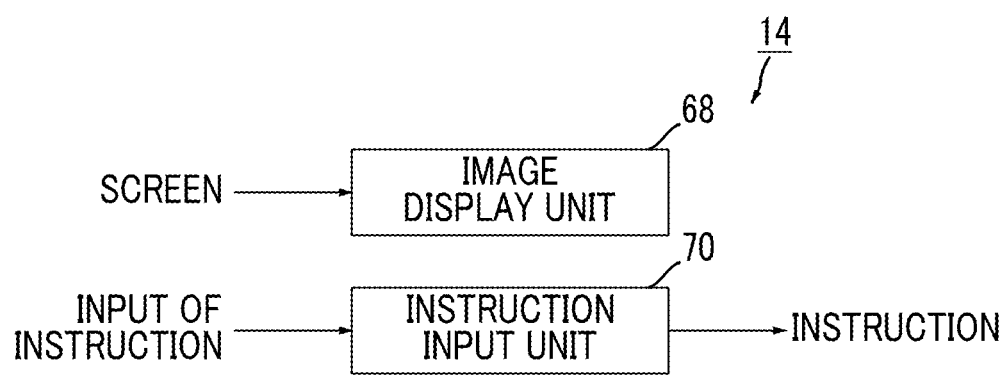
FIG. 8 is a block diagram of an embodiment showing the configuration of a terminal device of a user shown in FIG. 1.

Next, FIG. 8 is a block diagram of an embodiment showing the configuration of the terminal device of each user shown in FIG. 1. The terminal device 14 of each user shown in FIG. 8 includes the image display unit 68 and an instruction input unit 70.

In the terminal device 14, the image display unit 68 displays various setting screens, selection screens, check screens, input screens, creation screens, and the like, and is formed by a display device, such as a liquid crystal display, for example.

Subsequently, the instruction input unit 70 acquires various setting instructions, selection instructions, check instructions, input instructions, creation instructions, and the like input by the user, and is formed by input devices, such as a keyboard and a mouse.

In the case of the present embodiment, the image display unit 68 and the instruction input unit 70 are formed by a device in which a display device and an input device are integrated, such as a touch panel.

The number of terminal devices 14 corresponding to each user involved in the creation of a composite image does not necessarily to be one, and a plurality of terminal devices 14 may correspond to each user as long as the terminal devices 14 can correspond to the account of each user in the image processing apparatus 10.

Although not shown, each of the server 12 and the terminal device 14 includes, for example, a transmission and reception unit, which is a communication device for transmitting and receiving various kinds of data between the server 12 and the terminal device 14, and a control unit, which is a CPU for controlling the operation of each unit.

Figure 9:
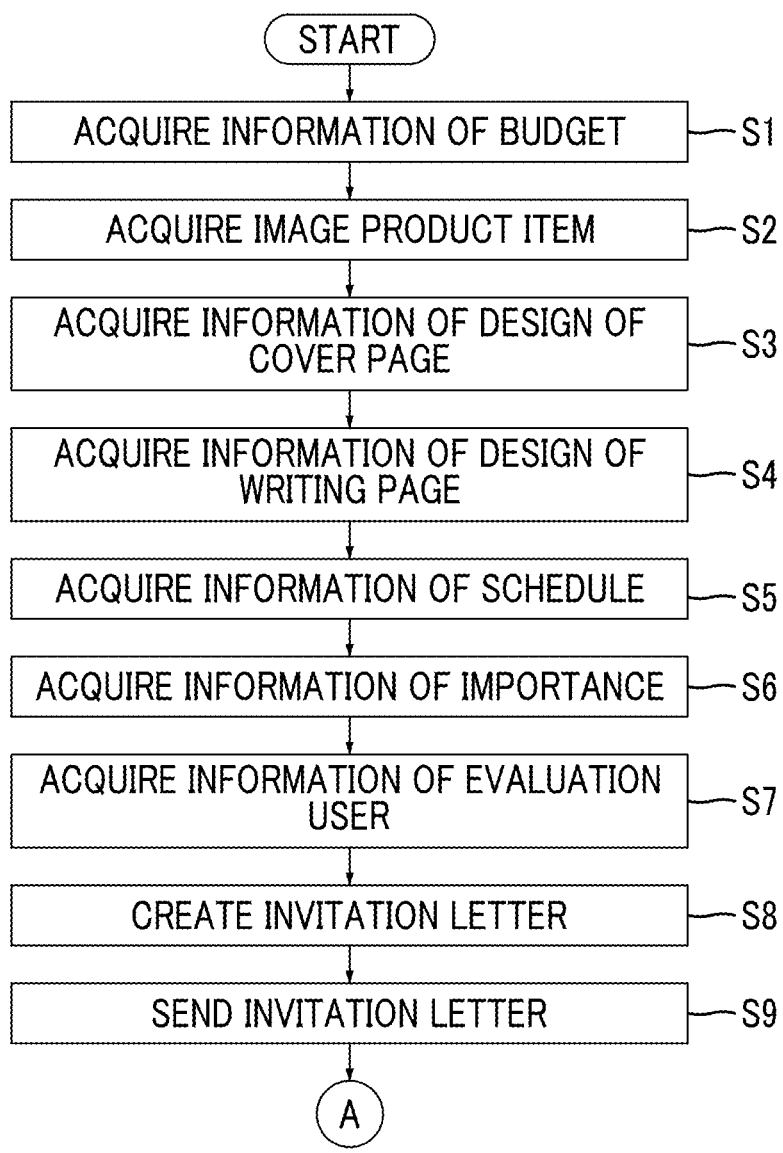
FIG. 9 is a flowchart of an embodiment showing the operation of the image processing apparatus shown in FIG. 1.
Figure 10:
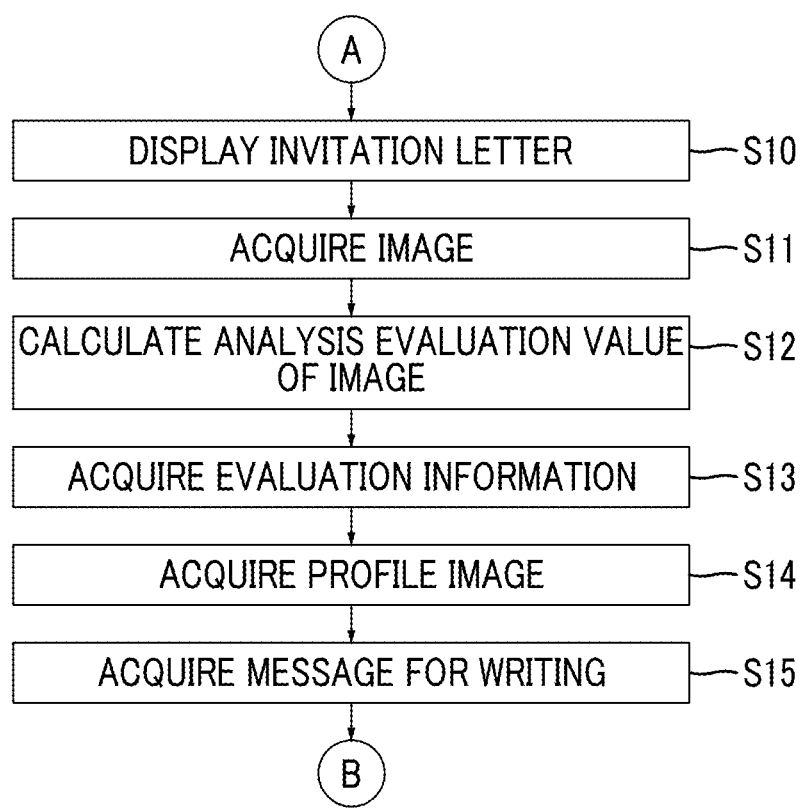
FIG. 10 is a flowchart of an embodiment showing the operation of the image processing apparatus subsequent to FIG. 9.
Figure 11:
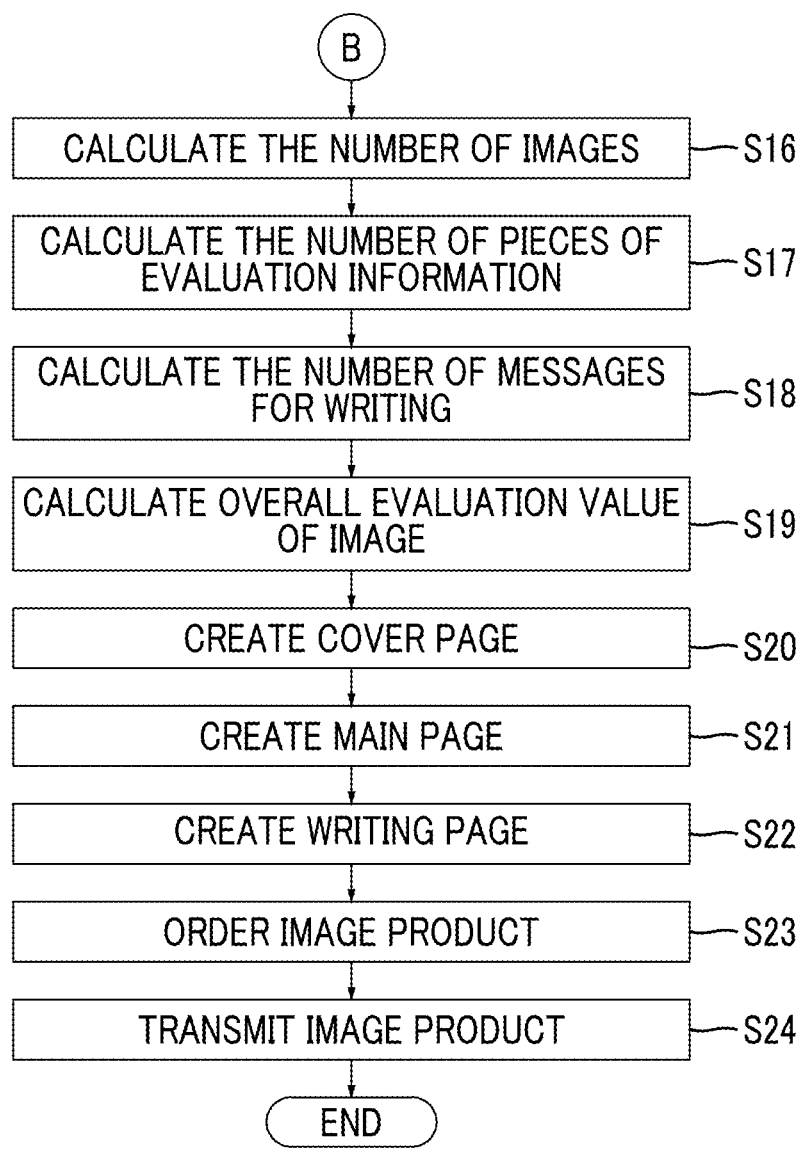
FIG. 11 is a flowchart of an embodiment showing the operation of the image processing apparatus subsequent to FIG. 10.

Next, the operation of the image processing apparatus 10 will be described with reference to flowcharts shown in FIGS. 9 to 11 and a display screen shown in FIGS. 12 to 34.

In the case of creating a composite image, first, a secretary user accesses a website for creating a composite image, which is provided by the image processing apparatus 10, through the instruction input unit 70 in the terminal device 14 of the secretary user.

Figure 12:
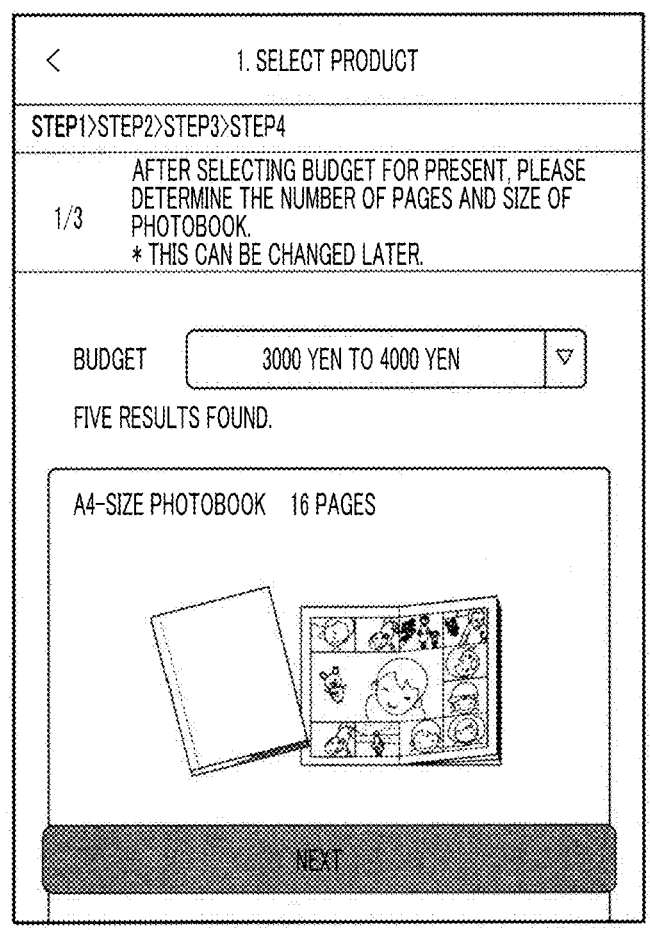
FIG. 12 is a conceptual diagram of an example showing a screen for setting a budget for a composite image.

When the secretary user accesses the website for creating a composite image, as shown in FIG. 12, a screen for setting a budget for the composite image is displayed on the image display unit 68 of the terminal device 14 of the secretary user by the budget setting section 28.

The secretary user sets a budget for the composite image to be created by the secretary user, through the instruction input unit 70, on the screen for setting the budget for the composite image. In the example shown in FIG. 12, a list of budgets for the composite image is registered in advance by the pull-down menu. The secretary user selects and sets one budget, for example, 3000 yen to 4000 yen, from the list of budgets for the composite image registered in the pull-down menu.

When the budget for the composite image is set, the information of the budget for the composite image set by the secretary user is acquired from the terminal device 14 of the secretary user by the budget setting section 28 (step S1).

Subsequently, one or more image product items corresponding to the information of the budget is presented by the product item acquisition section 30. In the example shown in FIG. 12, five photobooks having different sizes and number of pages are presented as image product items.

When the image product items are presented, a screen for setting one image product item among the one or more presented image product items is displayed on the image display unit 68 of the terminal device 14 of the secretary user by the product item acquisition section 30.

The secretary user selects and sets one image product item, among the one or more presented image product items, through the instruction input unit 70 on the screen for setting an image product item. In the example shown in FIG. 12, a 16-page photobook of A4 size is set.

After a photobook is set as an image product item, when a "Next" button is pressed, for example, when the "Next" button is tapped or clicked, one image product item set by the secretary user is acquired by the product item acquisition section 30 (step S2).

In addition, when a "<" button is pressed, it is possible to return to the previous screen. The same is true for subsequent screens.

Figure 13:
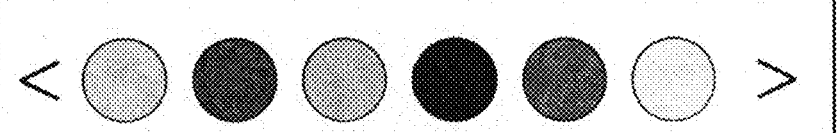
FIG. 13 is a conceptual diagram of an example showing a screen for setting the design of the cover page of a photobook.

Subsequently, as shown in FIG. 13, a screen for setting the design of the cover page of the photobook is displayed on the image display unit 68 of the terminal device 14 of the secretary user by the cover design setting section 32.

On the screen for setting the design of the cover page, the secretary user selects and sets the design of one cover page among the designs of one or more cover pages, in the example shown in FIG. 13, designs of three cover pages, through the instruction input unit 70. As the information of the design of the cover page of the photobook, for example, the secretary user can set the title of the photobook up to 20 characters to be described on the cover page and the color of the cover page.

After the design of the cover page is set, when the "Next" button is pressed, the information of the design of the cover page set by the secretary user is acquired from the terminal device 14 of the secretary user by the cover design setting section 32 (step S3).

Figure 14:
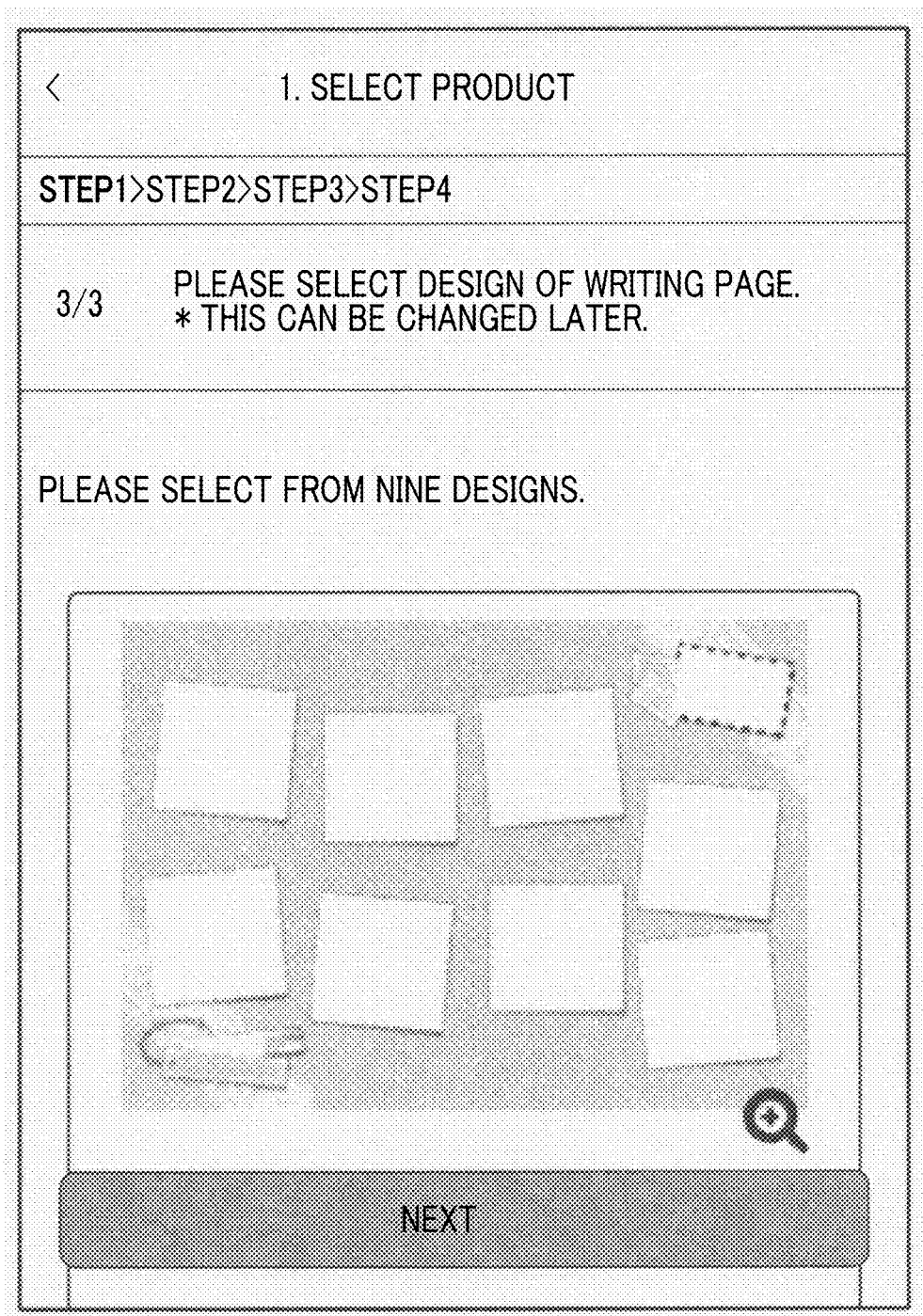
FIG. 14 is a conceptual diagram of an example showing a screen for setting the design of the writing page of a photobook.

Subsequently, as shown in FIG. 14, a screen for setting the design of the writing page of the photobook is displayed on the image display unit 68 of the terminal device 14 of the secretary user by the writing design setting section 34.

On the screen for setting the design of the writing page, the secretary user selects and sets one writing design among one or more writing designs, in the example shown in FIG. 14, nine writing designs, through the instruction input unit 70.

After the design of the writing page is set, when the "Next" button is pressed, the information of the design of the writing page set by the secretary user is acquired from the terminal device 14 of the secretary user by the writing design setting section 34 (step S4).

Figure 15:
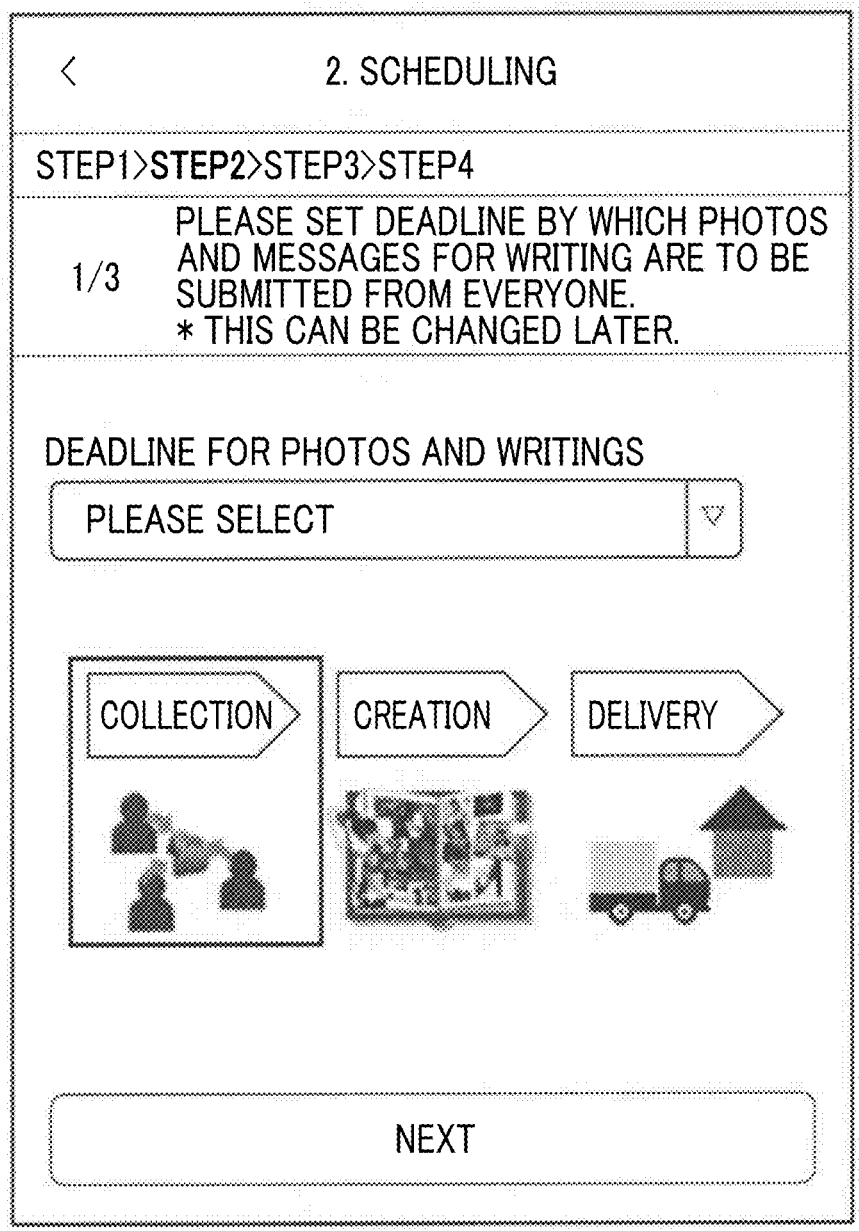
FIG. 15 is a conceptual diagram of an example showing a screen for setting the deadline for images and messages for writing.

Subsequently, as shown in FIG. 15, a screen for setting the deadline for images and messages for writing is displayed on the image display unit 68 of the terminal device 14 of the secretary user by the schedule setting section 36.

The secretary user sets the deadline for images and messages for writing, through the instruction input unit 70, on the screen for setting the deadline for images and messages for writing. In the example shown in FIG. 15, a list of dates within a predetermined period from the current date is registered in advance by the pull-down menu. The secretary user selects and sets one date, for example, December 2, as the deadline, from the list of dates registered in the pull-down menu.

After the deadline for images and messages for writing is set, when the "Next" button is pressed, the information of the deadline for images and messages for writing set by the secretary user is acquired from the terminal device 14 of the secretary user by the schedule setting section 36 (step S5).

Figure 16:
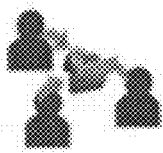
FIG. 16 is a conceptual diagram of an example showing a screen for setting a composite image creation period.

Subsequently, as shown in FIG. 16, a screen for setting a composite image creation period is displayed on the image display unit 68 of the terminal device 14 of the secretary user by the schedule setting section 36.

The secretary user sets a composite image creation period, through the instruction input unit 70, on the screen for setting the composite image creation period. In the example shown in FIG. 16, a list of dates within 30 days from the deadline for the period of images and messages for writing is registered in advance by the pull-down menu. The secretary user sets December 2 to 4 as a creation period by selecting one date, for example, December 4 from the list of dates registered in the pull-down menu.

After the composite image creation period is set, when the "Next" button is pressed, the information of the composite image creation period set by the secretary user is acquired from the terminal device 14 of the secretary user by the schedule setting section 36 (step S5).

Figure 17:
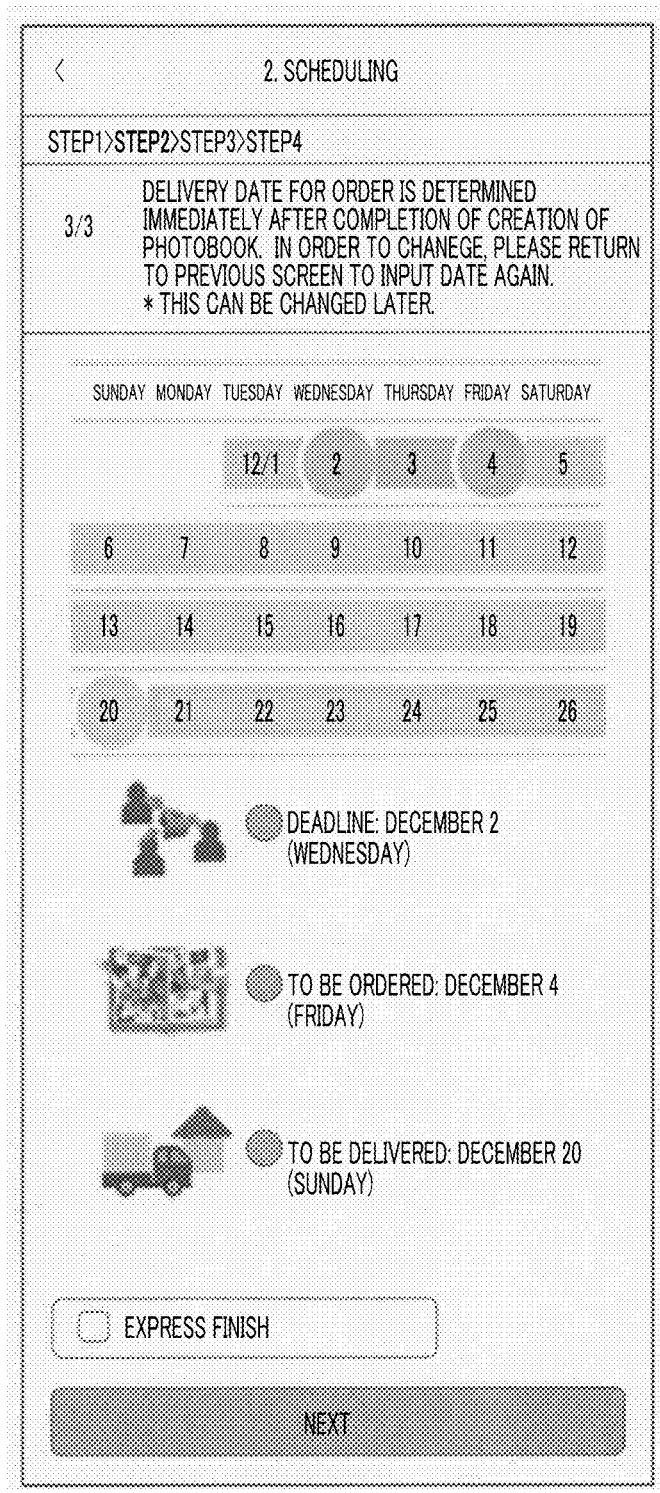
FIG. 17 is a conceptual diagram of an example showing a screen for setting the image product delivery date.

Subsequently, as shown in FIG. 17, a screen for setting the image product delivery date is displayed on the image display unit 68 of the terminal device 14 of the secretary user by the schedule setting section 36.

The image product delivery date is automatically set to a date after a predetermined period from the deadline of the composite image creation period, in the example shown in FIG. 17, December 20 after 16 days from December 4 that is the last day of the composite image creation period, by the schedule setting section 36.

The secretary user can change the image product delivery date, through the instruction input unit 70, on the screen for setting the image product delivery date. In the example shown in FIG. 17, it is possible to set the image product delivery date to a date before December 20, for example, by paying an extra fee and specifying the express finish.

After the image product delivery date is set, when the "Next" button is pressed, the information of the image product delivery date is acquired by the schedule setting section 36 (step S5).

In the case of creating a composite image using a plurality of images transmitted from the terminal devices 14 of the plurality of users, it is difficult to manage due dates. In the image processing apparatus 10, however, since it is possible to manage due dates, the burden on the secretary user can be reduced.

The secretary user can set the importance of each participating user involved in the creation of a composite image. The information of the importance of each participating user set by the secretary user is acquired by the importance setting section 72 (step S6).

In addition, the secretary user can set at least one participating user, among a plurality of participating users, as an evaluation user. The information of the evaluation user set by the secretary user is acquired by the evaluation user setting section 74 (step S7).

Figure 18:
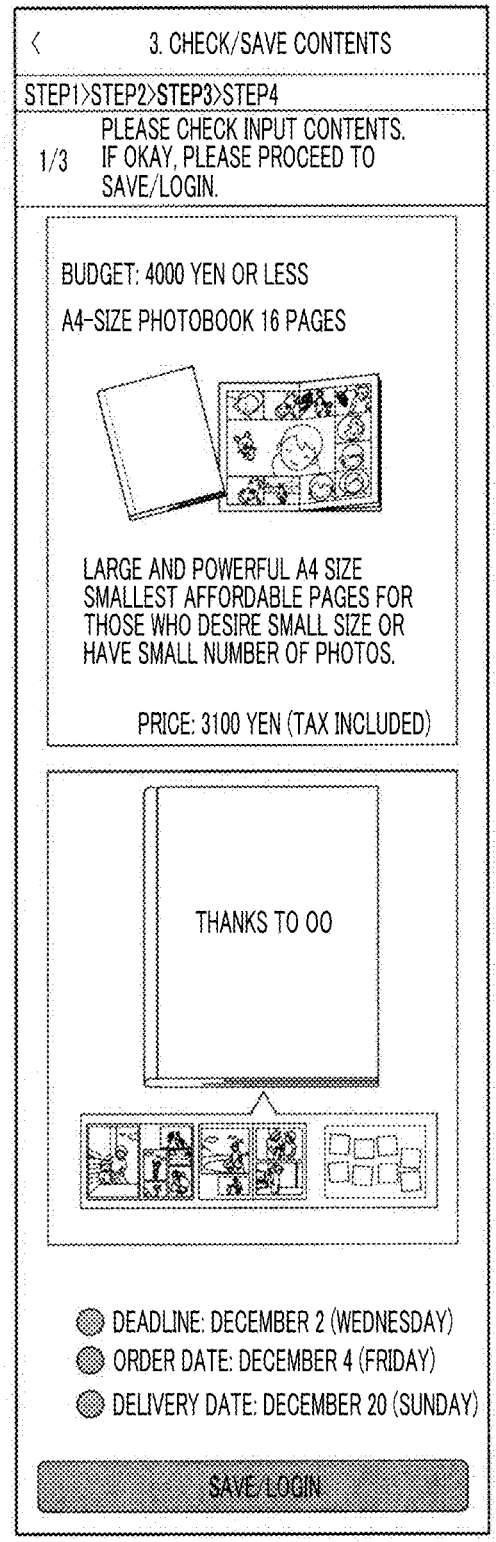
FIG. 18 is a conceptual diagram of an example showing a screen for checking the information of image product items and a schedule.

Subsequently, as shown in FIG. 18, a screen for checking the information of the image product item and the schedule is displayed on the image display unit 68 of the terminal device 14 of the secretary user by the setting storage section 38.

On the screen for checking the information of the image product item and the schedule, the secretary user checks the information of the image product item and the schedule. In a case where the setting is acceptable, a "Save/login" button is pressed to proceed to the next screen. In a case where it is necessary to change the setting, the "<" button is pressed to return to the previous screen.

When the "Save/login" button is pressed, as shown in FIG. 19, a screen for the secretary user to input account information for logging in to the image processing apparatus 10 is displayed on the image display unit 68 of the terminal device 14 of the secretary user by the setting storage section 38.

The secretary user inputs the e-mail address of the secretary user and the secretary password, as account information for logging in to the image processing apparatus 10, through the instruction input unit 70. In a case where the secretary user has already completed membership registration to the image processing apparatus 10, a "Login" button is pressed. In a case where the secretary user has forgotten the secretary password after membership registration, processing for recovering the secretary password is performed by pressing a "Password forgot" button.

When the "Login" button is pressed, the account information already stored is compared with the account information input by the secretary user by the account information storage section 40. In a case where the account information already stored matches the account information input by the secretary user, the secretary user can log in to the image processing apparatus 10.

On the other hand, in a case where membership registration has not yet been completed, processing for new membership registration is performed by pressing a "New membership registration" button. When the "New membership registration" button is pressed, the e-mail address and the secretary password input by the secretary user are acquired and are stored as the account information of the secretary user by the account information storage section 40. After the membership registration is completed, the terminal device 14 of the secretary user can log in to the image processing apparatus 10.

Subsequently, the information of the image product item acquired by the product item acquisition section 30 and the schedule acquired by the schedule setting section 36 is stored by the setting storage section 38.

Figure 20:
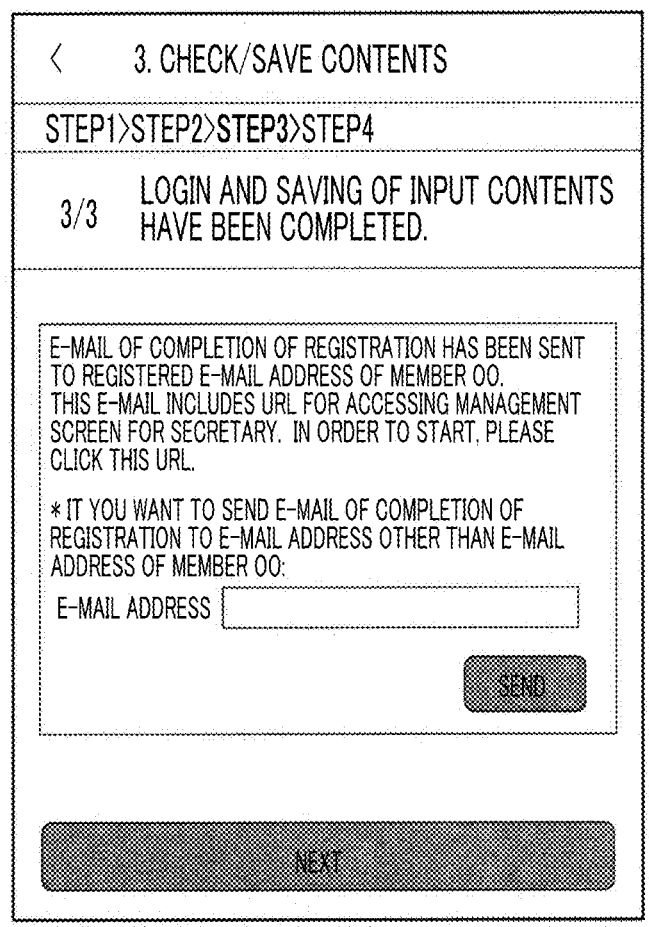
FIG. 20 is a conceptual diagram of an example showing a screen showing that the login of a secretary user and the storage of the information of image product items and the schedule have been completed.

Subsequently, as shown in FIG. 20, a screen showing that the login of the secretary user and the storage of the information of the image product item and the schedule have been completed is displayed on the image display unit 68 of the terminal device 14 of the secretary user by the setting storage section 38.

Subsequently, a message including the URL for accessing the management screen is transmitted by the management screen information transmission section 42. The message includes a notice indicating that the information of the image product item and the schedule has been stored.

In the example shown in FIG. 20, a message including the URL for accessing the management screen can be transmitted not only to the e-mail address of the secretary user but also to the e-mail address of participating users other than the secretary user, for example, the e-mail address of a deputy secretary user who acts as a secretary user, by inputting the e-mail address of participating users other than the secretary user through the instruction input unit 70.

Figure 21:
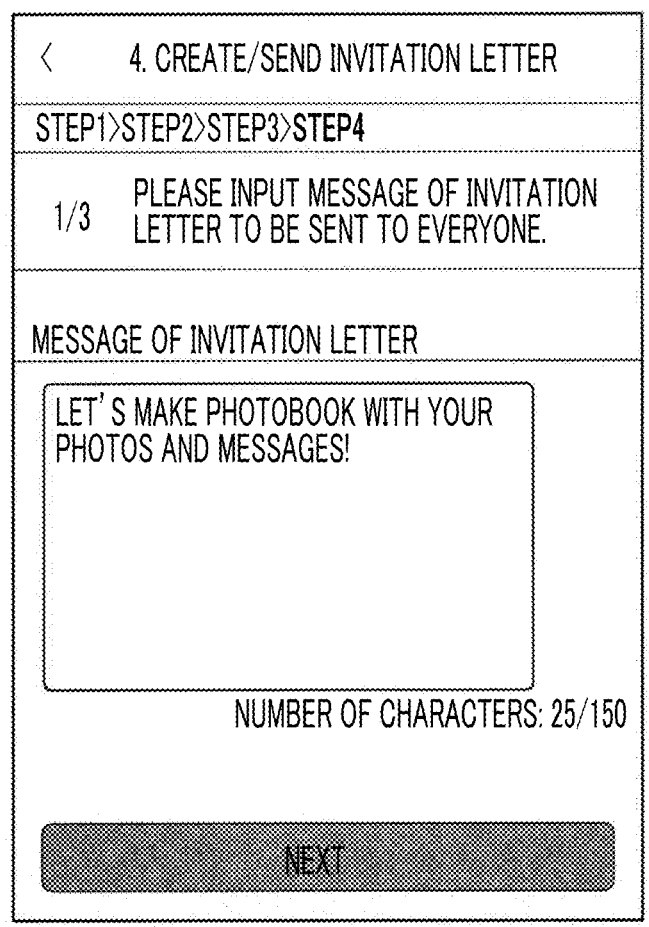
FIG. 21 is a conceptual diagram of an example showing a screen for creating an invitation letter to be sent to the terminal device of the participating user.

Subsequently, when the "Next" button is pressed, as shown in FIG. 21, a screen for creating an invitation letter to be sent to the terminal device 14 of the participating user is displayed on the image display unit 68 of the terminal device 14 of the secretary user by the upload prompting section 44.

On the screen for creating an invitation letter, the secretary user inputs a message included in the invitation letter within a predetermined number of characters, in the example shown in FIG. 21, 150 characters, through the instruction input unit 70. In the example shown in FIG. 21, an initial message "Let's make a photobook with your photos and messages!" is automatically input. Therefore, it is possible to save the time and effort for the secretary user to input a message. The secretary user may use the initial message as it is, or may input other messages.

When the "Next" button is pressed, the information of a message included in the invitation letter is acquired by the upload prompting section 44, so that the invitation letter is created (step S8).

Figure 22:
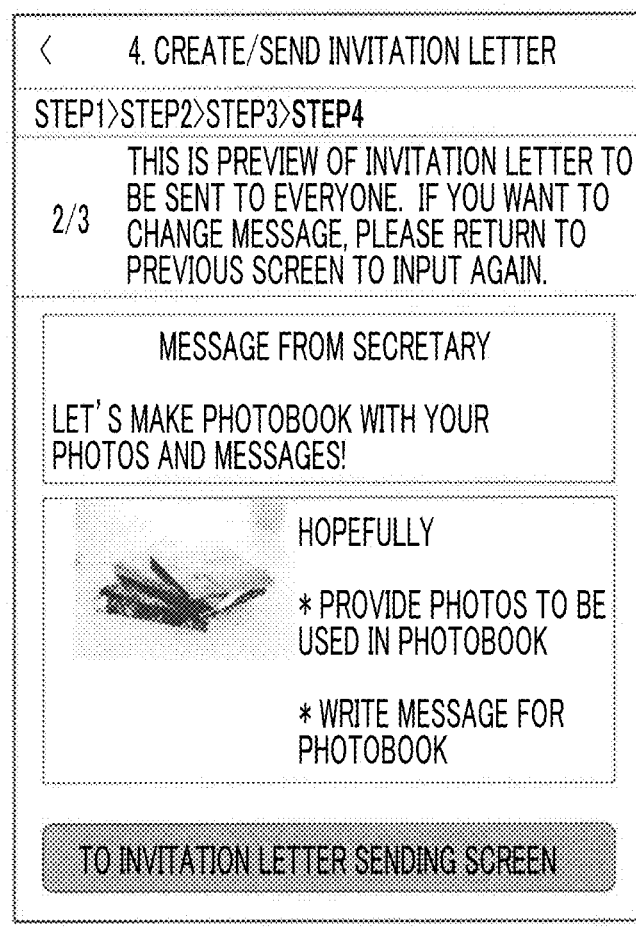
FIG. 22 is a conceptual diagram of an example showing a screen for checking the contents of the invitation letter.

Subsequently, as shown in FIG. 22, a screen for checking the contents of the invitation letter is displayed on the image display unit 68 of the terminal device 14 of the secretary user by the upload prompting section 44.

On the screen for checking the contents of the invitation letter, the secretary user checks the contents of the invitation letter. In a case where the contents are acceptable, a "To invitation letter send screen" button is pressed to proceed to the next screen. In a case where it is necessary to change the content, the "<" button is pressed to return to the previous screen.

When the "To invitation letter send screen" button is pressed, as shown in FIG. 23, a screen for sending an invitation letter to the terminal device 14 of the participating user is displayed on the image display unit 68 of the terminal device 14 of the secretary user by the upload prompting section 44.

On the screen for sending an invitation letter, the secretary user selects, as means for sending an invitation letter, in the example shown in FIG. 23, an SNS message or e-mail, through the instruction input unit 70. The invitation letter is sent to the SNS account of the participating user as an SNS message in a case where an "SNS" button is pressed, and is transmitted to the e-mail address of the participating user by e-mail in a case where an "E-mail" button is pressed.

The secretary user may send the invitation letter to all participating users involved in the creation of a composite image, or may send the invitation letter to only some participating users.

The SNS message or the e-mail includes not only the invitation letter but also images used in a composite image, evaluation information of images, an invitation URL for accessing the screen for each participating user to upload messages for writing or the like, and a common password (in the example shown in FIG. 23, "5865").

When the "Next" button is pressed, the invitation letter is sent to the terminal device 14 of each participating user by the upload prompting section 44 (step S9).

Each participating user receives the invitation letter through the terminal device 14 of the participating user, and accesses a website indicated by the invitation URL through the instruction input unit 70.

Figure 24:
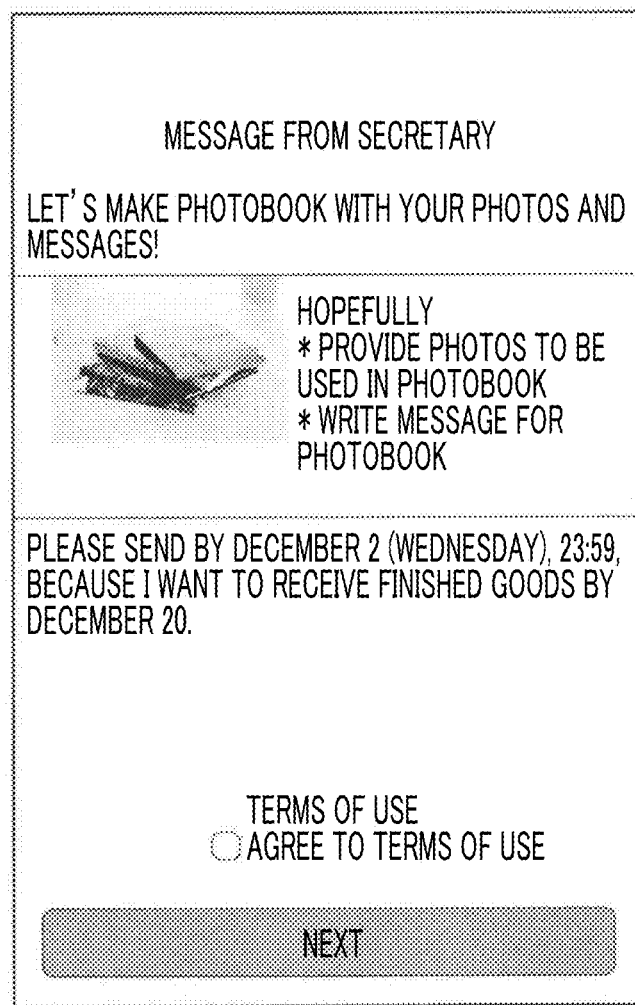
FIG. 24 is a conceptual diagram of an example showing a screen showing the received invitation letter.

When the participating user accesses the website indicated by the invitation URL, as shown in FIG. 24, a screen showing the received invitation letter is displayed on the image display unit 68 of the terminal device 14 of the participating user by the upload prompting section 44 (step S10).

In the invitation letter, in addition to the message from the secretary user, uploading images and messages for writing used in the composite image and information on the deadline (in the case of the present embodiment, 23:59 on Wednesday, December 2) are displayed as a request for participating users.

Each participating user views the screen showing the invitation letter to understand that the request to the participating user from the secretary user is the upload of images and messages for writing to be made as a photobook and that the deadline is December 2.

Figure 25:
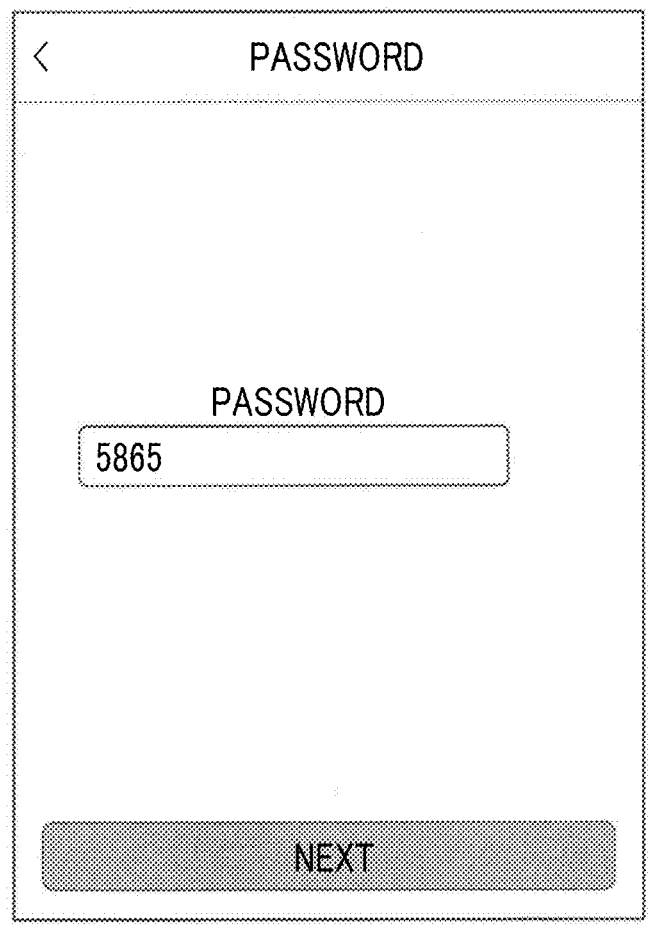

Subsequently, when a check box of "agree with terms and conditions" is checked and the "Next" button is pressed, as shown in FIG. 25, a screen for inputting a common password for accessing a screen for the participating user to upload images used in the composite image, evaluation information of images, messages for writing, and the like is displayed on the image display unit 68 of the terminal device 14 of the participating user by the account information storage section 40.

On the screen for inputting a common password, the participating user inputs the common password included in the received invitation letter (in the example shown in FIG. 25, "5865") through the instruction input unit 70.

Figure 26:
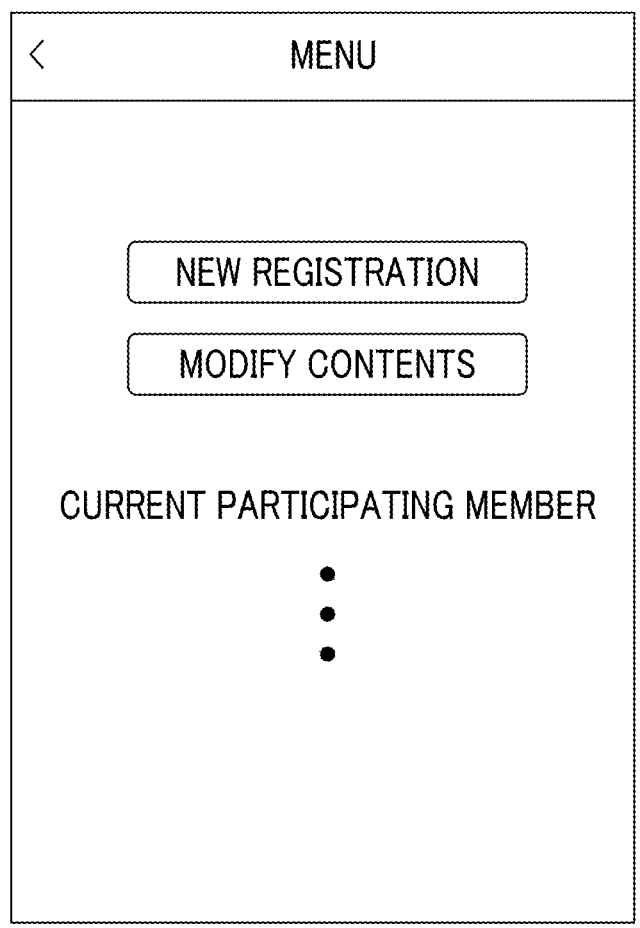
FIG. 26 is a conceptual diagram of an example showing a screen for registering a new participating user.

When the common password is input and the "Next" button is pressed, as shown in FIG. 26, a screen for registering a new participating user is displayed on the image display unit 68 of the terminal device 14 of the participating user by the account information storage section 40.

On the screen for registering a new participating user, the name of a user (current participating member) who is already registered as a participating user is displayed. It is not essential to display the names of registered participating users. However, by displaying the names of registered participating users, in a case where a user registers a participating user newly, the user can register the participating user with confidence if the name that the user knows is included in the names of the registered participating users.

Each participating user presses a "New registration" button in a case where the participating user has not yet been registered in the image processing apparatus 10, and presses "Modify contents" in a case where the participating user has already been registered in the image processing apparatus 10.

When the "New registration" button is pressed, as shown in FIG. 27, a screen for registering a name and an individual password (in FIG. 27, displayed as "secret code") to be registered as a participating user is displayed on the image display unit 68 of the terminal device 14 of the participating user by the account information storage section 40.

The participating user inputs a real name or nickname as a name and inputs an arbitrary character string as a secret code through the instruction input unit 70.

The name and the secret code of the participating user are account information of the participating user. As shown in FIG. 26, the participating user can modify images, evaluation information of images, messages for writing, and the like, which have already been uploaded, by pressing the "Modify contents" button on the screen for registering a new participating user and inputting the name and the secret code that have already been registered.

When the name and the secret code of the participating user are input and the "Next" button is pressed, the name and the secret code of the participating user are acquired and are stored as the account information of the participating user by the account information storage section 40.

Figure 28:
FIG. 28 is a conceptual diagram of an example showing a screen for a participating user to select an image to be uploaded.

Subsequently, as shown in FIG. 28, a screen for selecting an image uploaded by the participating user is displayed on the image display unit 68 of the terminal device 14 of the participating user by the image acquisition section 46.

The participating user can select an image to be uploaded by pressing an "Add image" on the screen for selecting an image to be uploaded. The number of images selected by the participating user is displayed on the screen for selecting an image to be uploaded.

After an image to be uploaded is selected, when the "Next" button is pressed, the image uploaded from the participating user, that is, the image submitted from the terminal device 14 of the participating user is acquired by the image acquisition section 46 (step S11). Thus, the image acquisition section 46 acquires a plurality of images transmitted from the terminal devices 14 of two or more participating users. Whenever an image is acquired by the image acquisition section 46, the image is analyzed by the image analysis section 58, and the analysis evaluation value of the image is calculated based on the analysis result of the image by the evaluation value calculation section 60 (step S12).

Figure 29:
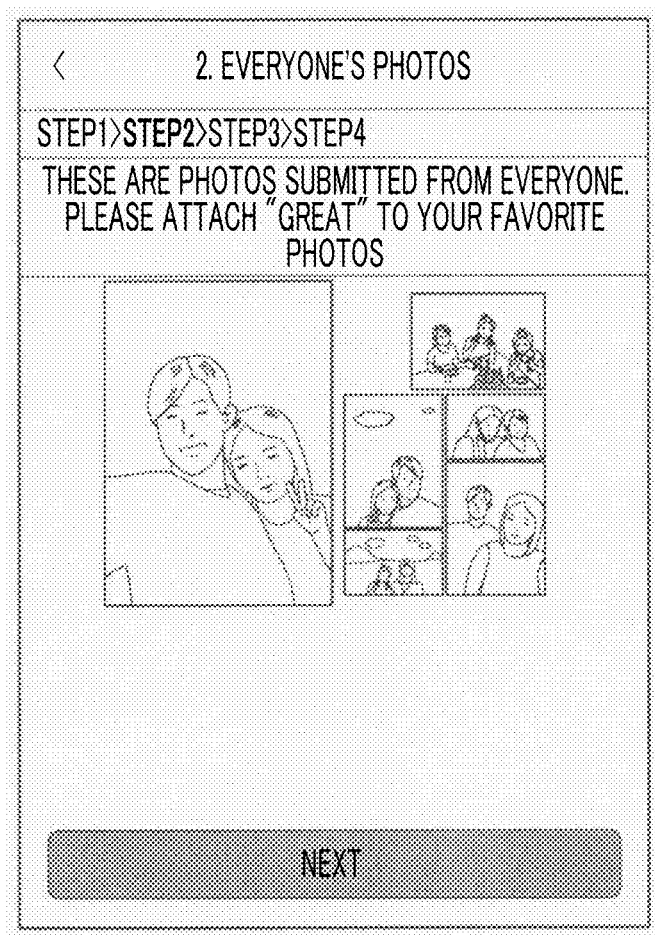
FIG. 29 is a conceptual diagram of an example showing a screen for evaluating each of a plurality of images transmitted from terminal devices of two or more participating users.

Subsequently, as shown in FIG. 29, a screen for evaluating each of the plurality of images transmitted from the terminal devices 14 of two or more participating users is displayed on the image display unit 68 of the terminal device 14 of each participating user by the evaluation information acquisition section 48.

The participating user can give evaluation information indicating high evaluation or low evaluation to each image through the instruction input unit 70 on the screen for evaluating each image. For example, the participating user can view each image, and can give evaluation information indicating high evaluation to an image that the participating user likes by pressing a "Good" button and give evaluation information indicating low evaluation to an image that the participating user dislikes by pressing a "Not good" button.

For example, the participating user can select one of a plurality of images on the image display unit 68 of the terminal device 14 of the participating user, display the selected image in an enlarged manner, and give evaluation information to the image displayed in an enlarged manner. Alternatively, the participating user may display a plurality of images as minified pictures, and give evaluation information to each of the displayed minified pictures.

In a case where the participating user displays a plurality of images as minified pictures, whenever evaluation information indicating high evaluation is acquired by the evaluation information acquisition section 48, the number of pieces of evaluation information indicating high evaluation for each image is calculated by the evaluation number calculation section 54, and the evaluation information acquisition section 48 may display minified pictures corresponding to each image in an enlarged manner as the number of pieces of evaluation information indicating high evaluation for each image increases.

Therefore, the participating user can give evaluation information to only an image having a large number of pieces of evaluation information indicating high evaluation among the minified pictures.

In addition, for an image that the image acquisition section 46 has acquired from the terminal device 14 of one second user of a plurality of users, for example, the terminal device 14 of one of the plurality of participating users, the evaluation information acquisition section 48 may prohibit the participating user himself or herself who has uploaded the image from giving evaluation information. Therefore, it is possible to maintain the fairness of evaluation information.

When evaluation information indicating high evaluation and low evaluation is given to each image from the terminal device 14 of each participating user, the evaluation information indicating high evaluation and low evaluation given to each image is acquired from the terminal device 14 of the participating user by the evaluation information acquisition section 48 (step S13).

In addition, whenever the image acquisition section 46 acquires each image, the evaluation prompting section 76 may transmit reminder information to prompt the assignment of evaluation information for each image, to the terminal devices 14 of the plurality of users. In a case where the information of the evaluation user is acquired by the evaluation user setting section 74, reminder information can be transmitted to only the terminal device 14 of the evaluation user by the evaluation prompting section 76.

This makes it easier to acquire evaluation information for each image from participating users.

In addition, in a case where a screen for evaluating each image, among the plurality of images, is displayed on the image display unit 68 of the terminal device 14 of each user, the recommended information display section 86 may display information indicating a recommended image for the image whose analysis evaluation value exceeds a threshold value.

Therefore, in the case of evaluating a plurality of images, each participating user can evaluate only a recommended image, that is, an image with a high analysis evaluation value.

Figure 30:
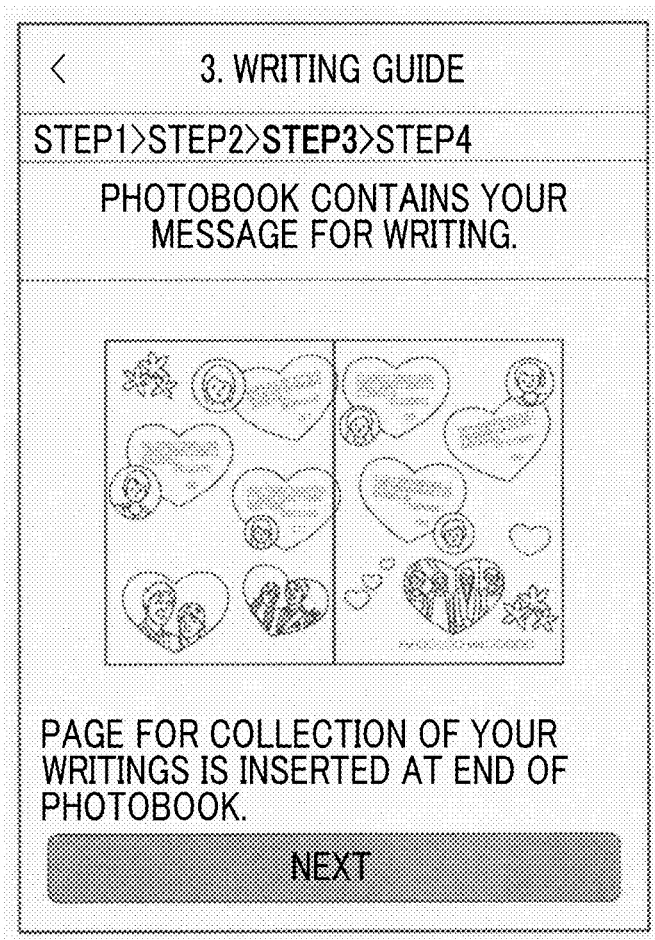
FIG. 30 is a conceptual diagram of an example showing a screen for notifying that a writing page has been inserted at the end of the photobook.

After the evaluation information is given, when the "Next" button is pressed, as shown in FIG. 30, a screen notifying that a writing page has been inserted at the end of the photobook is displayed on the image display unit 68 of the terminal device 14 of the participating user by the message acquisition section 50.

The participating user views and checks the screen notifying that a writing page has been inserted at the end of the photobook.

Figure 31:
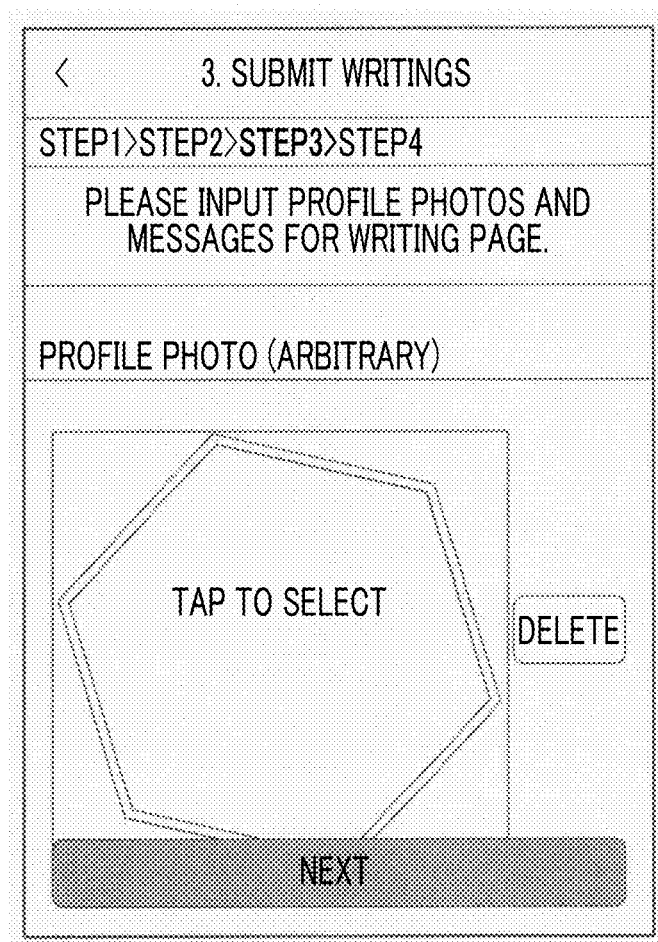
FIG. 31 is a conceptual diagram of an example showing a screen for setting a profile image of a participating user used in a writing page.

Subsequently, when the "Next" button is pressed, as shown in FIG. 31, a screen for setting the profile image of the participating user used in the writing page is displayed on the image display unit 68 of the terminal device 14 of the participating user by the message acquisition section 50.

By pressing the screen for setting a profile image, the participating user can select and set an image used as a profile image, among images owned by the participating user in the terminal device 14 of the participating user. In addition, the participating user can delete the already set profile image by pressing a "Delete" button, and can set the profile image again.

After the participating user has set the profile image, when the "Next" button is pressed, the profile image set by the participating user is acquired from the terminal device 14 of the participating user by the image acquisition section 46 (step S14).

Figure 32:
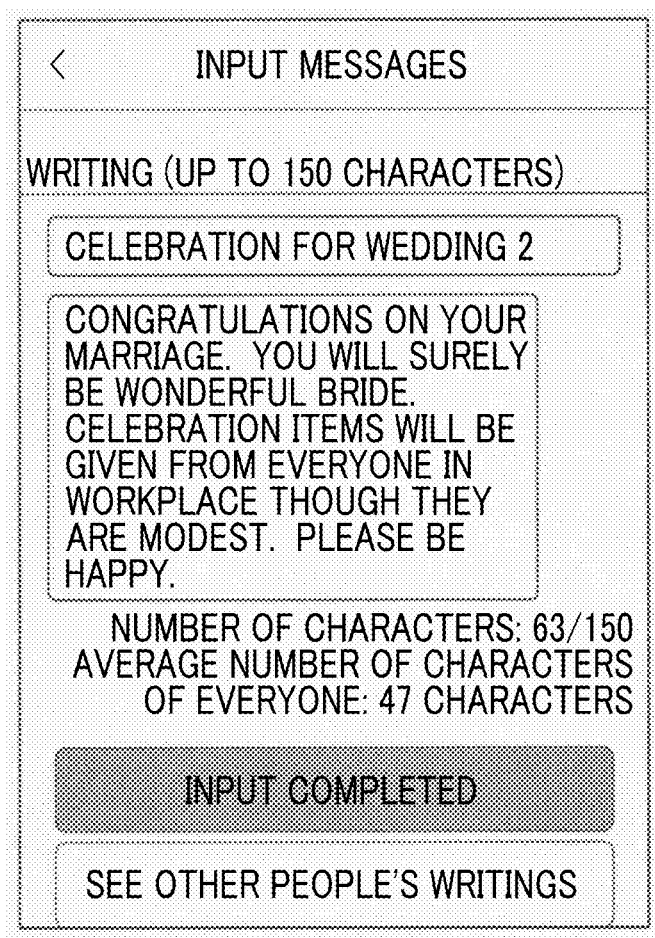
FIG. 32 is a conceptual diagram of an example showing a screen for inputting a message for writing.

Subsequently, as shown in FIG. 32, a screen for inputting a message for writing is displayed on the image display unit 68 of the terminal device 14 of the participating user by the message acquisition section 50.

On the screen for inputting a message for writing, the participating user inputs a message included in the writing page within 150 characters through the instruction input unit 70. In the example shown in FIG. 32, an initial message "Congratulations on your marriage. . . . Please be happy" is automatically input. Therefore, it is possible to save the time and effort for the participating user to input a message. The participating user may use the initial message as it is, or may input other messages.

In addition, each participating user can view messages for writing that other participating users have already uploaded by pressing a "See other people's writings" button on the screen for inputting a message for writing.

Figure 33:
FIG. 33 is a conceptual diagram of an example showing a screen for checking the message for writing input by the participating user.

After the participating user has input the message for writing, when an "Input completed" button is pressed, as shown in FIG. 33, a screen for checking the message for writing input by the participating user is displayed on the image display unit 68 of the terminal device 14 of the participating user by the message acquisition section 50.

On the screen for checking a message for writing, the participating user views and checks a message for writing. In a case where the message is acceptable, a "Submit" button is pressed to proceed to the next screen. In a case where it is necessary to change the message, the "<" button is pressed to return to the previous screen.

When the "Submit" button is pressed, a message for writing submitted by the participating user, that is, a message for writing uploaded from the terminal device 14 of the participating user, is acquired by the message acquisition section 50 (step S15).

Thus, in the case of creating a composite image, such as a photobook, using images of a plurality of users, it is possible to convey the feeling of each participating user to the recipient of the photobook as a message for writing by including not only the main page but also the writing page of the photobook.

Figure 34:
FIG. 34 is a conceptual diagram of an example showing a screen showing that the uploading of the message for writing has been completed.

Subsequently, as shown in FIG. 34, a screen showing that the message for writing has been submitted is displayed on the image display unit 68 of the terminal device 14 of the participating user.

Subsequently, when a "completed" button is pressed, the uploading of images, evaluation information of images, and messages for writing is completed.

Subsequently, when it is detected by the schedule setting section 36 that the deadline for images and messages for writing has passed, the number of images acquired by the image acquisition section 46 is calculated by the image number calculation section 52 (step S16). In addition, the number of pieces of evaluation information indicating high evaluation and low evaluation that has been acquired by the evaluation information acquisition section 48 is calculated by the evaluation number calculation section 54 (step S17), and the number of messages for writing acquired by the message acquisition section 50 is calculated by the message number calculation section 56 (step S18).

Subsequently, based on the evaluation information indicating high evaluation and low evaluation for each image, for example, the number of pieces of evaluation information, the evaluation value calculation section 60 adds or subtracts a value to or from the analysis evaluation value of each image to calculate the overall evaluation value of each image (step S19).

As described above, it is not essential to analyze an image and calculate the analysis evaluation value whenever an image is acquired. However, by analyzing an image and calculating the analysis evaluation value whenever an image is acquired, it is possible to calculate the overall evaluation value of an image in a short period of time compared with a case where all images are acquired and then the images are collectively analyzed to calculate the analysis evaluation value. As a result, it is possible to shorten the time taken to create a composite image.

For example, the evaluation value calculation section 60 may calculate the overall evaluation value by adding a weighting, which increases as the time at which evaluation information indicating high evaluation is given, in a predetermined period, becomes late, to the analysis evaluation value of each image.

In a predetermined period during which participating users upload images, an image uploaded earlier is more likely to be viewed by participating users than an image uploaded later. Therefore, for example, there is a high possibility that the number of pieces of evaluation information indicating high evaluation that is given by participating users will increase. In other words, an image uploaded immediately before the deadline for images is less likely to be viewed by participating users. Accordingly, even if the image uploaded immediately before the deadline for images is a favorite image of participating users, there is a high possibility that the number of pieces of evaluation information indicating high evaluation that is given by participating users will be reduced.

Therefore, even if the image uploaded later than the image uploaded earlier is a favorite image of the participating user, the number of pieces of evaluation information, which indicates high evaluation given to an image, for the image uploaded earlier is larger. As a result, there is a high possibility that the overall evaluation value for the image uploaded earlier will be high.

In contrast, by increasing the overall evaluation value of each image as the time at which evaluation information indicating high evaluation is given to the image becomes late, it is possible to fairly calculate the overall evaluation value of each image regardless of the upload time.

In addition, the overall evaluation value may also be calculated by adding a weighting, which increases as the ratio of the number of participating users who have given evaluation information indicating high evaluation to the number of participating users who have viewed each image increases, to the analysis evaluation value of each image.

For example, rather than an image in a case where the number of participating users who have given evaluation information indicating high evaluation to the image, among ten participating users who have viewed the image, is eight, an image in a case where the number of participating users who have given evaluation information indicating high evaluation to the image, among three participating users who have viewed the image, is three, can be considered to be an image with high preferences of participating users. Therefore, it is desirable to set the overall evaluation value of the image in the latter case to be higher than that in the former case.

In the case described above, the overall evaluation value may also be calculated by adding a weighting, which increases as the number of participating users who have viewed each image increases, to the analysis evaluation value of each image.

Rather than an image in a case where the number of participating users who have viewed the image is small, an image in a case where the number of participating users who have viewed the image is large can be considered to be an image in which a larger number of participating users are interested. Therefore, it is desirable to set the overall evaluation value of the image in the latter case to be higher than that in the former case.

In addition, the overall evaluation value may also be calculated by adding a weighting, which is higher for evaluation information indicating high evaluation acquired from the terminal devices 14 of participating users who have viewed an image included in a plurality of images a large number of times than for evaluation information indicating high evaluation acquired from the terminal devices 14 of participating users who have viewed an image included in a plurality of images a small number of times, to the analysis evaluation value of each image.

Rather than for the evaluation information indicating high evaluation acquired from the terminal devices 14 of participating users who have viewed an image included in a plurality of images a small number of times, for the evaluation information indicating high evaluation acquired from the terminal devices 14 of participating users who have viewed an image included in a plurality of images a large number of times, it can be considered that the evaluation information has been given by participating users who are highly interested in the composite image. Therefore, it is desirable to set the overall evaluation value of the image in the case of evaluation information indicating high evaluation acquired from the terminal devices 14 of participating users who have viewed an image included in a plurality of images a large number of times to be higher than that in the other case.

In addition, in a case where the information of the importance of each participating user has been acquired by the importance setting section 72, the evaluation value calculation section 60 may calculate the overall evaluation value by adding a weighting, which is higher for evaluation information indicating high evaluation acquired from the terminal devices 14 of participating users with high importance than for evaluation information indicating high evaluation acquired from the terminal devices 14 of participating users with low importance, to the analysis evaluation value of each image.

Therefore, it is possible to increase the overall evaluation value of an image to which evaluation information has been given by participating users with high importance among a plurality of participating users.

In addition, the overall evaluation value may also be calculated by adding a weighting, which is higher for evaluation information indicating high evaluation acquired from the terminal device 14 of a participating user appearing in a plurality of images than for evaluation information indicating high evaluation acquired from the terminal device 14 of a participating user not appearing in a plurality of images, to the analysis evaluation value of each image.

Rather than for the evaluation information indicating high evaluation acquired from the terminal device 14 of a participating user not appearing in a plurality of images, for the evaluation information indicating high evaluation acquired from the terminal device 14 of a participating user appearing in a plurality of images, it can be considered that the evaluation information has been given by participating users highly relevant to images used in the composite image. Therefore, it is desirable to set the overall evaluation value of the image in the case of evaluation information indicating high evaluation acquired from the terminal device 14 of a participating user appearing in a plurality of images to be higher than that in the other case.

In addition, for an image acquired from the terminal device 14 of one second user of a plurality of users, for example, one of a plurality of participating users, the image acquisition section 46 may calculate the overall evaluation value by adding a weighting, which is higher for evaluation information indicating high evaluation given by the participating user who has uploaded the image than for evaluation information indicating high evaluation given by participating users other than the participating user who has uploaded the image, to the analysis evaluation value of each image.

Rather than for the evaluation information indicating high evaluation given by participating users other than the participating user who has uploaded the image, for the evaluation information indicating high evaluation given by the participating user who has uploaded the image, it can be considered that the more detailed evaluation information has been given for the uploaded image by the participating user. Therefore, it is desirable to set the overall evaluation value of the image in the case of evaluation information indicating high evaluation given by the participating user who has uploaded the image to be higher than that in the other case.

In addition, the comment acquisition section 78 may acquire comments on each image given by a plurality of participating users from the terminal devices 14 of the plurality of users, and the evaluation value calculation section 60 may calculate the overall evaluation value by adding a value to the analysis evaluation value of the image to which the comments have been given among a plurality of images.

The image to which a comment has been given can be considered to be an image in which participating users are interested. Therefore, it is desirable to increase the overall evaluation value of the image to which a comment has been given.

The group forming section 80 may form one or more groups, each of which includes a plurality of similar images, by specifying a plurality of similar images among a plurality of images based on the analysis result of each image, and the evaluation value calculation section 60 may calculate the overall evaluation value by adding or subtracting a value to or from the analysis evaluation value of each of the plurality of similar images based on evaluation information, which indicates high evaluation and low evaluation for a plurality of similar images included in a group, for each group.

For example, the evaluation value calculation section 60 may calculate the overall evaluation value by uniformly adding the same value to the analysis evaluation value of each of similar images included in a group.

For example, in a case where one participating user has given evaluation information indicating high evaluation to one similar image among a plurality of similar images included in a group, it can be considered that the other similar images are also favorite images of the participating user. Therefore, it is desirable to uniformly increase the overall evaluation value of each of a plurality of similar images included in a group.

In addition, the overall evaluation value may also be calculated by adding a weighting, which increases as the analysis evaluation value of each of similar images increases, to the analysis evaluation value of each of similar images included in a group.

A similar image having a larger analysis evaluation value is an image with better image quality. Therefore, it is desirable to set the overall evaluation value of an image with better image quality, among a plurality of similar images included in a group, to be higher.

In addition, the similar image extraction section 82 may extract a first similar image whose analysis evaluation value exceeds a threshold value, among a plurality of similar images included in a group, for each group, and the evaluation value calculation section 60 may calculate the overall evaluation value by adding a weighting, which increases as the number of pieces of evaluation information indicating high evaluation for the plurality of similar images included in the group increases, to the analysis evaluation value of each first similar image extracted by the similar image extraction section 82.

Thus, by combining the image quality of the first similar image with the evaluation information indicating high evaluation given to the similar image, it is possible to increase the overall evaluation value of an image that is a high-quality image and that participating users like, among the plurality of similar images included in a group.

In addition, the similar image specifying section 84 may specify a second similar image having the largest number of pieces of evaluation information indicating high evaluation, among a plurality of similar images included in a group, for each group, and the evaluation value calculation section 60 may calculate the overall evaluation value by adding a weighting, which increases as the number of pieces of evaluation information indicating high evaluation for the second similar image specified by the similar image specifying section 84 increases, to the analysis evaluation value of each similar image.

Therefore, it is possible to increase the overall evaluation values of other similar images according to the number of pieces of evaluation information given to the second similar image having the largest number of pieces of evaluation information indicating high evaluation among a plurality of similar images included in a group.

In addition, the overall evaluation value may also be calculated by adding a weighting, which increases as the number of pieces of evaluation information indicating high evaluation for a plurality of similar images included in a group increases, to the analysis evaluation value of each similar image.

It can be considered that the larger the number of pieces of evaluation information indicating high evaluation, the more favorite image of participating users. Therefore, it is desirable to increase the overall evaluation values of a plurality of similar images included in a group as the number of pieces of evaluation information indicating high evaluation increases.

As described above, in the image processing apparatus 10, even in a case where a plurality of similar images are present, it is possible to calculate the overall evaluation value by correctly evaluating each similar image based on the evaluation information indicating high evaluation and low evaluation for a plurality of similar images.

Subsequently, the secretary user instructs the composite image creation unit 26 to create a composite image through the instruction input unit 70 in the terminal device 14 of the secretary user.

When the composite image creation unit 26 is instructed to create a composite image, the cover creation section 62 creates a cover page which is a design corresponding to the information of the design of the cover page, on which the title set by the secretary user is written, and which has a color set by the secretary user (step S20).

Subsequently, the main part creation section 64 creates a main page of the photobook using at least one image among the plurality of images acquired by the image acquisition section 46 (step S21).

In the main part creation section 64, the image division section divides the plurality of images acquired by the image acquisition section 46 into a plurality of groups corresponding to the number of main pages.

Subsequently, for each group of images, based on the overall evaluation value of each image, the image extraction section extracts a plurality of compositing target images used in the main pages, among the images included in the group, in order from the image with the highest overall evaluation value.

Subsequently, for each group of images, the image arrangement section determines the size of each compositing target image and the arrangement position in the main page based on the overall evaluation value of each image, and arranges the compositing target image on the corresponding main page. For example, a compositing target image with the highest overall evaluation value among a plurality of compositing target images is arranged at the center position of the page with a size larger the other compositing target images.

Subsequently, the writing creation section 66 creates a writing page of the design corresponding to the information of the design of the writing page by using the profile images and messages for writing of participating users (step S22).

In the writing creation section 66, the message division section divides the messages for writing acquired by the message acquisition section 50 into groups the number of which corresponds to the number of writing pages.

Subsequently, for each group of messages for writing, for example, the message arrangement section combines messages for writing included in a group with the profile image of the corresponding participating user, and arranges a result of the combination on the writing page of a page corresponding to the group of messages for writing. Thus, a writing page is created. In each writing page, messages for writing are sequentially arranged, for example, in order in which messages for writing are uploaded.

As described above, using a plurality of images, profile images of participating users, and messages for writing that have been acquired from the terminal devices 14 of two or more participating users, a photobook including a cover page corresponding to the information of the design of the cover page, main pages, and writing pages corresponding to the information of the design of the writing pages is automatically created by the cover creation section 62, the main part creation section 64, and the writing creation section 66.

In the image processing apparatus 10, it is possible to create a composite image, such as a photobook including not only the main page but also the writing page. In addition, it is possible to create a composite image reflecting not only the image quality but also the preferences of a plurality of participating users by determining not only images used in the main page but also the size of each image and the arrangement position in the main page based on the overall evaluation value of each image.

The secretary user views each page of the photobook, which includes the cover page, the main page, and the writing page that have been automatically created, in the terminal device 14 of the secretary user. The secretary user may adopt the photobook created automatically as it is, or may edit the contents of each page, for example, images used in each page, the size of each image, and the arrangement positions of images and messages for writing. In addition, it is possible to add comments, add a stamp image, and change the background type and color of each page.

The secretary user completes the creation of the photobook during the composite image creation period set by the schedule setting section 36, in the case of the present embodiment, by December 4, and orders an image product with the contents of the photobook that has been created (step S23). The image product ordered by the secretary user includes at least one of a photobook of a paper medium and a photobook of electronic data.

When the image product is ordered, the photobook of the ordered image product is created and is sent to the delivery address by the delivery date of the image product set by the schedule setting section 36, in the case of the present embodiment, by December 20 (step S24). In the case of a photobook of a paper medium, for example, the photobook of a paper medium is transmitted to the delivery address. In the case of a photobook of electronic data, for example, the photobook of electronic data or an URL for downloading electronic data is transmitted to the e-mail address of the delivery address.

As described above, in the image processing apparatus 10, it is possible to create a composite image, such as a photobook including a writing page, using a plurality of images and messages for writing acquired from the terminal devices 14 of a plurality of participating users.

It is not essential for only the secretary user to create a composite image, and a plurality of users involved in the creation of a composite image may create a composite image together with each other, or at least one of a plurality of users may create a composite image.

The specific configuration of each unit of the image processing apparatus 10 is not particularly limited, and it is possible to use various configurations capable of performing the same functions.

In the embodiment described above, the server 12 includes the information setting unit 18, the information management unit 20, the data acquisition unit 22, the data analysis unit 24, and the composite image creation unit 26, at least one of these may be provided in the terminal device 14 of the user.

In the apparatus of the invention, each component of the apparatus may be formed using dedicated hardware, or each component may be formed using a programmed computer.

The method of the invention can be realized, for example, by a program causing a computer to execute each step of the method. In addition, it is also possible to provide a computer-readable recording medium in which the program is recorded.

While the invention has been described in detail, the invention is not limited to the above-described embodiment, and various improvements and modifications may be made without departing from the scope and spirit of the invention.

10: image processing apparatus
12: server
14: terminal device (client)
16: network
18: information setting unit
20: information management unit
22: data acquisition unit
24: data analysis unit
26: composite image creation unit
28: budget setting section
30: product item acquisition section
32: cover design setting section
34: writing design setting section
36: schedule setting section
38: setting storage section
40: account information storage section
42: management screen information transmission section
44: upload prompting section
46: image acquisition section
48: evaluation information acquisition section
50: message acquisition section
52: image number calculation section
54: evaluation number calculation section
56: message number calculation section 58: image analysis section
60: evaluation value calculation section
62: cover creation section
64: main part creation section
66: writing creation section
68: image display unit
70: instruction input unit
72: importance setting section
74: evaluation user setting section
76: evaluation prompting section
78: comment acquisition section
80: group forming section
82: similar image extraction section
84: similar image specifying section
86: recommended information display section

What is claimed is:

1. An image processing apparatus, comprising:
a processor configured to
acquire a plurality of images from terminal devices of a plurality of users through a network for a predetermined period;
analyze contents of each of the plurality of images;
calculate an analysis evaluation value of each of the images based on an analysis result of each of the images; and
acquire evaluation information, which indicates evaluation for each of the images that is given by the plurality of users, from the terminal devices of the plurality of users through the network for the predetermined period;
wherein the processor further adds a weighting, which increases as a time at which evaluation information indicating the high evaluation is given, in the predetermined period, becomes late, to the analysis evaluation value of each of the images.

2. The image processing apparatus according to claim 1, the processor further configured to:
form one or more groups, each of which includes a plurality of similar images, by specifying the plurality of similar images, among the plurality of images, based on the analysis result of each of the images after the predetermined period has passed,
wherein the processor calculates an overall evaluation value for each of the images included in the group by adding a value to an analysis evaluation value of each of the images included in the group based on evaluation information, which indicates high evaluation given to the images in the group, for each of the groups, and
wherein the processor adds a weighting, which increases as a number of pieces of evaluation information indicating the high evaluation for each of the plurality of similar images increases, to the analysis evaluation value of at least one of the similar images in the group,
wherein the processor uniformly adds the same value to the analysis evaluation value of each of the similar images.

3. The image processing apparatus according to claim 1, the processor further configured to:
form one or more groups, each of which includes a plurality of similar images, by specifying the plurality of similar images, among the plurality of images, based on the analysis result of each of the images after the predetermined period has passed,
wherein the processor calculates an overall evaluation value for each of the images included in the group by adding a value to an analysis evaluation value of each of the images included in the group based on evaluation information, which indicates high evaluation given to the images in the group, for each of the groups, and
wherein the processor adds a weighting, which increases as a number of pieces of evaluation information indicating the high evaluation for each of the plurality of similar images increases, to the analysis evaluation value of at least one of the similar images in the group, and
wherein the processor further adds a weighting, which increases as the analysis evaluation value of each of the similar images increases, to the analysis evaluation value of each of the similar images.

4. The image processing apparatus according to claim 1, the processor further configured to:
form one or more groups, each of which includes a plurality of similar images, by specifying the plurality of similar images, among the plurality of images, based on the analysis result of each of the images after the predetermined period has passed,
wherein the processor calculates an overall evaluation value for each of the images included in the group by adding a value to an analysis evaluation value of each of the images included in the group based on evaluation information, which indicates high evaluation given to the images in the group, for each of the groups, and
wherein the processor adds a weighting, which increases as a number of pieces of evaluation information indicating the high evaluation for each of the plurality of similar images increases, to the analysis evaluation value of at least one of the similar images in the group,
calculate the number of pieces of evaluation information, which indicates the high evaluation for each of the images, after the predetermined period has passed; and
extract a similar image, of which the analysis evaluation value exceeds a threshold value, among the plurality of similar images for each of the groups,
wherein the processor adds the weighting to an analysis evaluation value of the similar image extracted by the processor.

5. The image processing apparatus according to claim 1, the processor further configured to:
form one or more groups, each of which includes a plurality of similar images, by specifying the plurality of similar images, among the plurality of images, based on the analysis result of each of the images after the predetermined period has passed,
wherein the processor calculates an overall evaluation value for each of the images included in the group by adding a value to an analysis evaluation value of each of the images included in the group based on evaluation information, which indicates high evaluation given to the images in the group, for each of the groups, and
wherein the processor adds a weighting, which increases as a number of pieces of evaluation information indicating the high evaluation for each of the plurality of similar images increases, to the analysis evaluation value of at least one of the similar images in the group,
calculate the number of pieces of evaluation information, which indicates the high evaluation for each of the images, after the predetermined period has passed; and
specify a similar image with the highest number of pieces of evaluation information indicating the high evaluation, among the plurality of similar images, for each of the groups,
wherein the processor adds a weighting, which increases as the number of pieces of evaluation information indicating the high evaluation for the similar image specified by the processor increases, to the analysis evaluation value of each of the similar images.

6. The image processing apparatus according to claim 1, the processor further configured to:
form one or more groups, each of which includes a plurality of similar images, by specifying the plurality of similar images, among the plurality of images, based on the analysis result of each of the images after the predetermined period has passed,
wherein the processor calculates an overall evaluation value for each of the images included in the group by adding a value to an analysis evaluation value of each of the images included in the group based on evaluation information, which indicates high evaluation given to the images in the group, for each of the groups, and
wherein the processor adds a weighting, which increases as a number of pieces of evaluation information indicating the high evaluation for each of the plurality of similar images increases, to the analysis evaluation value of at least one of the similar images in the group,
calculate the number of pieces of evaluation information, which indicates the high evaluation for each of the images, after the predetermined period has passed, and
wherein the processor adds the weighting, which increases as the number of pieces of evaluation information indicating the high evaluation for each of the plurality of similar images increases, to the analysis evaluation value of each of the similar images.

7. The image processing apparatus according to claim 1, the processor further configured to:
transmit reminder information to prompt assignment of the evaluation information for each of the images, through the network, to the terminal devices of the plurality of users whenever each of the images is acquired.

8. The image processing apparatus according to claim 7, the processor further configured to:
acquire information of at least one third user among the plurality of users set by at least one first user among the plurality of users, who is an evaluation user who gives the evaluation information, through the network from a terminal device of the first user,
wherein the processor transmits the reminder information to a terminal device of the evaluation user.

9. The image processing apparatus according to claim 7, wherein the processor transmits the reminder information using an application for sending and receiving an e-mail or a message.

10. The image processing apparatus according to claim 1, wherein the processor further acquires evaluation information indicating low evaluation for each of the images given by the plurality of users, and
the processor further calculates the overall evaluation value by subtracting a value from the analysis evaluation value of each of the images based on the evaluation information indicating the low evaluation for the plurality of images.

11. The image processing apparatus according to claim 1, the processor further configured to:
acquire comments on each of the images given by the plurality of users, through the network, from the terminal devices of the plurality of users,
wherein the processor adds a value to an analysis evaluation value of an image to which the comments have been given among the plurality of images.

12. The image processing apparatus according to claim 1, the processor further configured to:
in a case where an image having the analysis evaluation value exceeding a threshold value, among the plurality of images, is displayed on an image display of a terminal device of each of the users, display information indicating a recommended image for the image having the analysis evaluation value exceeding the threshold value.

13. The image processing apparatus according to claim 1, wherein the processor prohibits one second user himself or herself, among the plurality of users, from giving the evaluation information to an image that the processor acquires from a terminal device of the one second user.

14. The image processing apparatus according to claim 13,
wherein the processor displays an image, which is selected from the plurality of images by each of the users, in an enlarged manner on an image display of a terminal device of each of the users, and acquires evaluation information given to the image displayed in an enlarged manner.

15. The image processing apparatus according to claim 13,
wherein, in a case where the users display the plurality of images as minified pictures on image displays of terminal devices of the users, the processor acquires evaluation information given to each of the minified pictures.

16. The image processing apparatus according to claim 13, the processor further configured to:
calculate the number of pieces of evaluation information indicating the high evaluation for each of the images,
wherein, in a case where the users display the plurality of images as minified pictures on image display devices of the terminal devices of the users, the processor displays the minified picture corresponding to each of the images so as to be more enlarged as the number of pieces of evaluation information indicating the high evaluation for each of the images increases.

17. An image processing method, comprising:
a step in which a processor acquires a plurality of images from terminal devices of a plurality of users through a network for a predetermined period;
a step in which the processor analyzes contents of each of the plurality of images;
a step in which the processor calculates an analysis evaluation value of each of the images based on an analysis result of each of the images;
a step in which the processor acquires evaluation information, which indicates evaluation for each of the images that is given by the plurality of users, from the terminal devices of the plurality of users through the network for the predetermined period;
a step in which the processor forms one or more groups, each of which includes a plurality of similar images, by specifying the plurality of similar images, among the plurality of images, based on the analysis result of each of the images after the predetermined period has passed; and
a step in which the processor calculates an overall evaluation value by adding a value to an analysis evaluation value of each of the plurality of similar images based on evaluation information, which indicates high evaluation for the plurality of similar images, for each of the groups;
wherein the processor further adds a weighting, which increases as a time at which evaluation information indicating the high evaluation is given, in the predetermined period, becomes late, to the analysis evaluation value of each of the images.

18. A non-transitory computer-readable storage medium storing a program causing a computer to execute each step of the image processing method according to claim 17.

* * * * *